(12) United States Patent
Ono et al.

(10) Patent No.: US 6,742,163 B1
(45) Date of Patent: May 25, 2004

(54) DISPLAYING MULTIPLE DOCUMENT ABSTRACTS IN A SINGLE HYPERLINKED ABSTRACT, AND THEIR MODIFIED SOURCE DOCUMENTS

(75) Inventors: Kenji Ono, Kanagawa-ken (JP); Hideki Hirakawa, Kanagawa-ken (JP); Kazuo Sumita, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/016,488

(22) Filed: Jan. 30, 1998

(30) Foreign Application Priority Data

Jan. 31, 1997 (JP) .............................. 9-019393

(51) Int. Cl.⁷ .............................................. G06F 7/00
(52) U.S. Cl. ......................... 715/513; 715/530; 715/531
(58) Field of Search ................................ 707/500, 501, 707/530, 531, 513; 715/500, 501.1, 530, 531, 513

(56) References Cited

U.S. PATENT DOCUMENTS

| | | | | |
|---|---|---|---|---|
| 4,358,824 A | * | 11/1982 | Glickman et al. .............. 707/5 |
| 5,050,071 A | * | 9/1991 | Harris et al. ..................... 707/1 |
| 5,077,668 A | * | 12/1991 | Doi .............................. 707/531 |
| 5,297,027 A | * | 3/1994 | Morimoto et al. .......... 707/501 |
| 5,384,703 A | * | 1/1995 | Withgott et al. ............ 707/531 |
| 5,768,580 A | * | 6/1998 | Wical .......................... 395/618 |
| 5,778,397 A | * | 7/1998 | Kupiec et al. ............... 707/500 |
| 5,815,830 A | * | 9/1998 | Anthony ........................ 707/6 |
| 5,867,164 A | * | 2/1999 | Bornstein et al. ........... 345/357 |
| 5,873,107 A | * | 2/1999 | Borovoy et al. ................ 707/3 |
| 5,918,240 A | * | 6/1999 | Kupiec et al. ............... 707/531 |
| 5,924,108 A | * | 7/1999 | Fein et al. .................... 707/531 |
| 5,946,678 A | * | 8/1999 | Aalbersberg .................... 707/3 |
| 5,960,383 A | * | 9/1999 | Fleischer ....................... 704/9 |
| 5,963,205 A | * | 10/1999 | Sotomayor ................... 345/333 |
| 5,978,820 A | * | 11/1999 | Mase et al. .................. 707/531 |
| 6,128,635 A | * | 10/2000 | Ikeno .......................... 707/532 |
| 6,199,077 B1 | * | 3/2001 | Inala et al. .................. 707/501 |
| 6,230,168 B1 | * | 5/2001 | Unger et al. ................. 707/501 |
| 6,345,284 B1 | * | 2/2002 | Dinkelacker ................ 345/769 |
| 6,460,034 B1 | * | 10/2002 | Wical ............................ 707/5 |

FOREIGN PATENT DOCUMENTS

| | | |
|---|---|---|
| JP | 4-18673 | 1/1992 |
| JP | 5-101102 | 4/1993 |
| JP | 7-249042 | 9/1995 |
| JP | 8-55132 | 2/1996 |

OTHER PUBLICATIONS

Automatic Hypermedia Link Generation, IBM TBD, vol. 35, ISS.#1A, p. 447–448, 6/92.*

Legrand, J., "A Contribution to Indexing in Legal Information Retrieval", IEEE, 1997, pp. 213–218.*

M. Ito et al., National Technical Report, vol. 42 No. 5, Oct. 18, 1996.

* cited by examiner

Primary Examiner—Stephen S. Hong
Assistant Examiner—Cesar B Paula
(74) Attorney, Agent, or Firm—Finnegan, Henderson, Farabow, Garrett & Dunner, L.L.P.

(57) ABSTRACT

A computerized document processing apparatus for creating an abstract includes document storage for storing a computerized document, keyword storage for storing keywords, an abstract creation section for creating an abstract by extracting at least a character string containing a keyword stored in the keyword storage section from the computerized document stored in the document storage section, a document modification section for modifying the computerized document to link the keyword in the computerized document with the same keyword in the abstract, and a display section for displaying the abstract and the modified document that is linked with the abstract. The modified document is displayed when the linked keyword in the abstract is selected.

1 Claim, 24 Drawing Sheets

```
<HEAD>
<TITLE>K.K.ASHISUTO DBJ's Seminar Tokyo 96/4/23</TITLE>
</HEAD>
<BODY>
<A NAME="top"></A>
<A HREF="../../index-j.html"><IMG SRC="../gif/tab0_off.gif"BORDER=0 ALT=[ASHISUTO]</A><A HREF="../homepage.htm"><IMG
SRC="../gif/tab1_off.gif"BORDER=0 ALT="[DB DIVISION]"></A><A HREF="../news.htm"><IMG SRC="../gif/tab2_on.gif"BORDER=0
ALT=[NEWS]"></A><A HREF="../standard.htm"><IMG SRC="../gif/tab3_off.gif"BORDER=0 ALT=[STANDARD]"></A><A HREF="../s
eminar.htm"><IMG SRC="../gif/tab4_off.gif"BORDER=0 ALT="[SEMINAR]"></A><A HREF="../release.htm"><IMG SRC="../gif/tab5
_off.gif"BORDER=0 ALT="[RELEASE]"></A><A HREF="../orawww.htm"><IMG SRC="../gif/tab6_off.gif"BORDER=0 ALT="[OACLE]"</A
><P>
<HR><P>
FUSION OF INTERNET SYSTEM AND OACLE<BR>
"FOR MOUNTING INTRANET"
</I></B></H1><P>
<IMG SRC="tky423.gif"VSPACE=10></CENTER>
<H3>REPORT ON SEMINAR</H3>
Now, Japan Oacle Co. is going to release a new version of Oacle WebServer Option. Prior to the release, K.K. Ashisuto
has held a seminar for proposing guidelines for smoothly and stably utilizing the computing environment of "Intranet"
in order to make good use of Internet for a corporate information system.<P>
Ashisuto has shown the guidelines which facilitate the shift to "Intranet", for which only concepts have preceded,and
which allow it to be stably operated by interspersing demonstrations with a belief of "seeing is believing" by the
database technology accumulated so far,the experience of constructing corporate backbone systems and the advanced
software information for stably operating networks.
In addition, with the cooperation of Japan Oacle Co., we have introduced Oacle Webserver Option, the latest version,
and explained the superiority of the OACLE Database System in "Intranet."<P>
<HR><P>
Although we had planned to have acout 200 attendance, there were much more applications even in a short period of
time. We were then obliged to change the place of meeting to that holding 500 attendance in haste and were really
surprised that people are interested in so much. Although we might have not been able to attend well, we appreciate
that such many guests have attended. We would like to say Thank You in this occasion.<P>
<CENTER><IMG SRC="tky423-1.gif"></CENTER>
<H3><Program></H3>

</BODY>
```

Fig. 3

FUSION OF INTERNET SYSTEM AND OACLE

"FOR MOUNTING INTRNET"

<REPORT ON SEMINAR>
 Now, Japan Oacle Co. is going to release a new version of Oacle Webserver Option. Prior to the release, K.K. Ashisuto has held a seminar for proposing guidelines for smmthly and stably utilizing the computing environment of "Intranet" in order to make good use of Internet for a corporate information system.

Ashisuto has shown the guidelines which facilitate the shift to
only concepts have preceded, and which allow it be stably operat
demonstrations with a belief of "Seeing is believing" by the dot
the database technology accmulated so far, the experience of con
backbone systems and the advanced software information for stabl In addition, with the cooperation oh Japan Oacle Co., we have i
Webserver Option, the latest version, and explained the superior
Database System in "Intranet".

Although we had planned to have about 200 attendance, there wer
even in a short period of time. e were then obliged to change th
to that holding 500 attendance in haste and were really surprise
interested in so much. Although we might have not been able to a
that such many guests have attended. e would like to <Program>

Fig. 4

```
 1 <HEAD>
 2 <TITLE>K.K.ASISUTO DBJ's Seminar Tokyo 96/4/23<TITLE>
 3 </HEAD>
 4 <BODY>
 5 <A NAME="top"></A><A HREF="../../index-j.html">
 6 <IMG SRC="../gif/tab0_off.gif"BORDER=0 ALT="[ASHISUTO]"></A>
 7 <A HREF="../homepage.htm">
 8 <IMG SRC="../gif/tab1_off.gif"BORDER=0 ALT="[DB DIVISION]"></A>
 9 <A HREF="../news.htm"><IMG SRC=../gih/tab2_on.gif"BORDER=0 ALT"[NEWS]"></A>
10 <A HREF="../standard.htm">
11 <IMG SRC="../gif/tab3_off.gif"BORDER=0 ALT="[STANDARD]"></A>
12 <A HREF="../seminar.htm">
13 <IMG SRC="../gif/tab4_off.gif"BORDER=0 ALT="[SEMINAR]"></A>
14 <A HREF="../release.htm">
15 <IMG SRC="../gif/tab5_off.gif"BORDER=0 ALT="[RELEASE]"></A>
16 <A HREF="../orawww.htm"><IMG SRC="../gif/tab6_off.gif"BORDER=0 ALT="[OACLE]">
17 </A><P>
18 <HR><P>
19 <CWNTER><H1><B><I>
20 FUSION OF INTERNET SYSTEM AND OACLE
21 "FOR MOUNTING INTRANET"
22 </I></B></H1><P>
23 <IMG SRC="tky423.gif" VSPACE=10></CENTER>
24 <H3><REPORT ON SEMINAR></H3>
25  Now, Japan Oacle Co. Is going to release a new version of Oacle Webserver
26 Option. Prior to the release, K.K. Ashisuto has held a seminar for proposing
27 guidelines for smmthly and stably utilizing the computing environment of
28 "Intranet" in order to make good use of Internet for a corporate information
29 system.<P>
30  Ashisuto has shown the guidelines which facilitate the shift to "Intranet, for which
31 only concepts have preceded, and which allow it be stably operated by interspersing
32 demonstrations with a belief of "Seeing is believing" by the dateving" by
33 the database technology accumulated so far, the experience of constructing corprate
34 backbone systems and the advanced software information for stably operating networks.
35  In addition, with the cooperation oh Japan Oacle Co., we have introduced Oacle
36 Webserver Option, the latest version, and explained the superiority of the Oacle
37 Database System in "Intranet".<P>
38 <P>
39  Although we had planned to have about 200 attendance, there were much more applications even in a short
40 period of time. e were then obliged to change the place of meeting to that holding 500 attendance in haste and
41 were really surprised that eople are interested in so much. Although we might have not been able to attend
42 well, we appreciate that such many guests have attended. We would like to say Thank You in this occasion.
43 <CENTER><IMG SRC="tky423-1.gif"></CENTER>
44 <H3><Program></H3>
       (
       )
76 </BODY>
```

Fig. 5

```
1   <HEAD>
2   <TITLE>K.K.ASISUTO DBJ's Seminar Tokyo 96/4/23<TITLE>
3   </HEAD>
4   <BODY>
5   <A NAME="top"></A><A HREF="../../index-j.html">
6   <IMG SRC="../gif/tab0_off.gif" BORDER=0 ALT="[ASHISUTO]"></A>
7   <A HREF="../homepage.htm">
8   <IMG SRC="../gif/tab1_off.gif" BORDER=0 ALT="[DB DIVISION]"></A>
9   <A HREF="../news.htm"><IMG SRC="../gif/tab2_on.gif" BORDER=0 ALT="[NEWS]"></A>
10  <A HREF="../standard.htm">
11  <IMG SRC="../gif/tab3_off.gif" BORDER=0 ALT="[STANDARD]"></A>
12  <A HREF="../seminar.htm">
13  <IMG SRC="../gif/tab4_off.gif" BORDER=0 ALT="[SEMINAR]"></A>
14  <A HREF="../release.htm">
15  <IMG SRC="../gif/tab5_off.gif" BORDER=0 ALT="[RELEASE]"></A>
16  <A HREF="../orawww.htm"><IMG SRC="../gif/tab6_off.gif" BORDER=0 ALT="[OACLE]"></A>
17  </A><P>
18  <HR><P>
19  <CWNTER><H1><B><I>
20  FUSION OF INTERNET SYSTEM AND OACLE
21  -FOR MOUNTING INTRANET-
22  </I></B></H1><P>
23  <IMG SRC=tky423.gif" VSPACE=10></CENTER>
24  <H3><REPORT ON SEMINAR></H3>
25  Now, Japan Oacle Co. is going to release a new version of Oacle Webserver
26  Option. Prior to the release, K.K. Ashisuto has held a seminar for proposing
27  guidelines for smothly and stably utilizing the computing environment of
28  "Intranet" in order to make good use of Internet for a corporate information system.
29  <P>
30  Ashisuto has shown the guidelines which facilitate the shift to "Intranet, for which
31  only concepts have preceded, and which allow it be stably operated by interspersing
32  demonstrations with a belief of "Seeing is believing" by the dateving" by
33  the database technology accumulated so far, the experience of constructing corprate
34  backbone systems and the advanced software information for stably operating networks.<P>
35  In addition, with the cooperation oh Japan Oacle Co., we have introduced Oacle
36  Webserver Option, the latest version, and explained the superiority of the Oacle
37  Database System in "Intranet".
38  Although we had planned to have about 200 attendance, there were much more applications even in a short period
39  of time. We were then obliged to change then obliged to change the place of meeting to that holding
40  500 attendance in haste and really surprised that people are interested in so much. Although we might
41  have not been able to attend well, we appreciate that such many guests have attended. We would like to say
42  Thank You in this occasion.
43  <CENTER><IMG SRC="tky423-1.gif"></CENTER>
44  <H3><Program></H3>

76  </BODY>
```

Fig. 6

FUSION OF INTERNET SYSTEM AND OACLE "FOR MOUNTING INTRNET"

<REPORT ON SEMINAR>

Webserver

Now, Japan Oacle Co. is going to release a new version of Oacleor proposing Option. Prior to the release, K.K. Ashisuto has held a seminar f  nment of guidelines for smmthly and stably utilizing the computing envirnformation "Intranet" in order to make good use of Internet for a corporate system.

Ashisuto has shown the guidelines which facilitate the shift to "Intranet, for which only concepts have preceded, and which allow it be stably operated by interspersing demonstrations with a belief of "Seeing is believing" by the dateving" by the database technology accmulated so far, the experience of constructing corprate backbone systems and the advanced software information for stably operating networks.

In addition, with the cooperation oh Japan Oacle Co., we have introduced Oacle Webserver Option, the latest version, and explained the superiority of the Oacle Database System in "Intranet".

Although we had planned to have about 200 attendance, there were much more applications even in a short period of time. e were then obliged to change the place of meeting to that holding 500 attendance in haste and were really surprised that people are interested in so much. Although we might have not been able to attend well, we appreciate that such many guests have attended. e would like to sey Thank You in this occasion.

<Program>
  |
  [Header, etc.]
    Invitation to Intranet Solution Seminar Introducton of InfoNOC:
  [Place of Occurrence of Retrieve Words]
    ... InfoNOC is an Internet service specialized in out-sourc ing. .../...
    InfoNOC constructs and operates Intranet environment of a corporate in batch.
    .../... InfoNOC provides and operates an optimum system based on abundant
    achievements from one server to a large scale Intranet environment and provider
    environment. .../... Any one from an individual to various corporate, groups
    and self-governing bodies can have a server of an potimum environment easily
    and can actively use Internet in a full scale. .../
  [Header, etc.]
    InfoNOC Service / InfoNOC is an Internet service specialized in out-sourcing.
    / Hme Server Service / Secure Private Line Service /
  |

Fig. 7

```
1 20 ~FUSION OF <A HREF="mod.html #kwic1"><STRONG>INTERNET<STRONG></A>SYSTEM AND OACLE~<BR>
2 21 "FOR MOUNTING <A HREF="mod.html #kwic2"><STRONG>INTRANET</STRONG></A>
3 26 for a corrporate infomation system <A HREF="mod.html #kwic3"><STRONG>Internet</STRONG></A>
4 27 smoothly and stably utilzing the computing environment of <A HREF="mod.html #kwic4"><STRONG>
INTRANET</STRONG></A> in order to make good use of
5 30 Ashisuto has show the guidelines which facilitate the shift to <A HREF="mod.html #kwic5">
<STRONG>INTRANET</STRONG></A>
6 36 explained the superiority of the OAC LE Database System in <A HREF="mod.html #kwic6"><STRONG>
INTRANET</STRONG></A>
7 60 <A HREF="mod.html #kwic7"><STRONG>INTRANET</STRONG></A>
8 63 <A HREF="mod.html #kwic8"><STRONG>INTRANET</STRONG></A>
```

Fig. 8

```
1  20  ~FUSION OF <A HREF="mod.html#kwic1"><STRONG>INTERNET<STRONG></A>SYSTEM AND OACLE~<BR>
2  21  "FOR MOUNTING <A HREF="mod.html#kwic2"><STRONG>INTRANET</STRONG></A>
3  24  <REPORT ON SEMINAR>
4  44  <PROGRAM>
5  67  <       >
```

Fig. 9

```
1   20  FUSION OF INTERNET SYSTEM AND OACLE
2   21  "FOR MOUNTING INTRANET"
3   24  <H3><REPORT ON SEMINAR></H3>
4   25   Now, Japan Oacle Co. is going to release a new version of Oacle Webserver Option. Prior to
5   26  the release, K.K. Ashisuto has held a seminar for proposing guidelines for smoothly and stably
6   27  utilizing the computing environment of "Intranet" in order to make good use of Internet for
7   28  a corporate information system.
8   30   Ashisuto has shown the guidelines which facilitate the shift to "Intranet, for which
9   31  only concepts have preceded, and which allow it be stably operated by interspersing
10  32  demonstrations with a belief of "Seeing is believing" by the dateving" by
11  33  the database technology accumulated so far, the experience of con structing corprate
12  34  backbone systems and the advanced software information for stably operating networks.
```

Fig. 10

```
<HTML>
<HEAD>
<title>ABSTRCT DOCUMENT</title>
</HEAD>

<A HREF="mod.html">K.K.ASISUTO DBJ's Seminar Tokyo 96/4/23</A>
<DL>
<DT>[KWIC]
<DD>
~FUSION OF <A HREF="mod.html #kwic1"><STRONG></A><STRONG>INTERNET<STRONG></A>SYSTEM AND OACLE~<BR>
"FOR MOUNTING <A HREF="mod.html #kwic2"><STRONG>INTRANET</STRONG></A>
for a corrporate infomation system <A HREF="mod.html #kwic3"><STRONG>Internet</STRONG></A>
smoothly and stably utilzing the computing environment of <A HREF="mod.html #kwic4"><STRONG>
INTRANET</STRONG></A>
Ashisuto has show the guidelines which facilitate the shift to <A HREF="mod.html #kwic5">
<STRONG>INTRANET</STRONG></A>
explained the superiority of the OAC LE Database System in <A HREF="mod.html #kwic6"><STRONG>
INTRANET</STRONG></A>
<A HREF="mod.html #kwic7"><STRONG>INTRANET</STRONG></A>
<A HREF="mod.html #kwic8"><STRONG>INTRANET</STRONG></A>
<DT>[Header]
<DD>
<REPORT ON SEMINAR></PROGRAM></      >
<DT>[Head Character String]
<DD>
Now, Japan Oacle Co., is going to release a new version of Oacle WebServer/
in order to make good use of INternet for acorporate information system./
for which only conceots have preceded, and which allow it to be stably operated by interspersing/
demonstrations with a belief of "Seeing is believing" by the database technology accumulated so/
far, the experience of constructing corporate backbone systems and the advanced software information
</DL>

</HTML>
```

Fig. 11

(a)
```
<html>
<head>
<title>retrieve keyword</title>
</head>
<body background="/graphic/bg1.gif">
keyword: Intranet<br>
Number of Hits: 29<br>
Number of Presentation: 20<br>
<IMG SRC="/grphic/LINE.GIF">

<DL><DT><A HREF="http://www.yo.rim.or.jp/~knakamur/index.html">Intranet,My Kids,Computer
</A><DD>This is a page of a pocket dictionary of Intrnet(introduction to know-how for constructing
Intranet, shareware and NetBiff). My Kids, Computer and Link. NetBiff strongly supports Intranet.
</DT></DL>

</body>
</html>
```

(b)
```
keyword: Intranet<br>
Number of Hits: 29<br>
Number of Presentation: 20<br>

Intranet, My Kids, Computer
   This is a page of a pocket dictionary of Intrnet(introduction to know-how for constructing
   Intranet, shareware and NetBiff), My Kids, Computer and Link. NetBiff strongly supports Intranet.
```

Fig. 18

```
<html>
<head>
<title>            </title>
</head>
<body background="/graphic/bgl.gif">
keyword: Internet,Intranet<br>
Number of Hits: 17<br>
Number of Presentation: 17<br>
<HR><P>
<DL>
<DT><A HREF="homrpage.5.html">K.K.ASHISUTO DBJ's Seminar Tokyo 96/4/23</A>: <DD>
<DL COMPACT>
<DT>
...~FUSION OF<A HREF="homepage.5.html#kwic1"><b>INTERNET</b><A>·SYSTEM AND OACLE~.../
...FOR MOUNTING<A HREF="homepage.5.html#kwic2"><b> INTRANET</b></A>.../
...Now, Japan Oacle Co.. is going to release a new version of Oacle WebServer Option. Prior to
the release, K.K. Ashisuto has held a seminar for oroposing guidelines for smoothly and stably
utilizing the computing environment of "Intranet" in order to make good use of Internet for
a corporate information system./
...Ashisuto has shown the guidelines which facilitate the shift to "Intranet", for which only
concepts have preceded,andwhich allow it to be stably operated by interspersing demonstrations
with a belief of "seeing is believing" by the detabase technology accumulated so far, the experience
of constructing corporate backbone systems and the advanced software information for stably
operating networks..../
<BR>
<DT>[Header]
<DD>~FUSION OF<b>INTERNET</b>·SYSTEM AND OACLE~/"FOR MOUNTING<b>INTRANET</b>/~FUSION OF
<b>INTERNET</b>·SYSTEM AND OACLE~/"FOR MOUNTING<b>INTRNET</b>/<REPORT ON SEMINAR>/
<PROGRAM>/<BR>
</DL>

</body>
</html>
```

Fig. 19

```
keyword: Internet,Intranet<br>
Number of Hits: 17<br>
Number of Presentation: 17<br>
```

K.K.ASHISUTO DBJ's Seminar Tokyo 96/4/23:

...Now, Japan Oacle Co. is going to release a new version of Oacle WebServer Option. Prior to the release, K.K. Ashisuto has held a seminar for proposing guidelines for smoothly and stably utilizing the computing environment of "Intranet" in order to make good use of Internet for a corporate information system./
...Ashisuto has shown the guidelines which facilitate the shift to "Intranet", for which only concepts have preceded,andwhich allow it to be stably operated by interspersing demonstrations with a belief of "seeing is believing" by the database technology accumulated so far, the experience of constructing corporate backbone systems and the advanced software information for stably operating networks...../
<DT>[Header]
~FUSION OF INTERNET·SYSTEM AND OACLE~/"FOR MOUNTING INTRANET"/~ FUSION OF INTERNET SYSTEM AND OACLE~/"FOR MOUNTING INTRANET/<REPORT ON SEMINAR>/<PROGRAM>/

Fig. 20

```
NET-DATE. INC. HOME PAGE
  Product Index
    Memory Index
      Memory Index for DOS/V
        MM0437
```

Fig. 23

```
INTRODUCTION OF PRODUCTS
  PRODUCT INFORMATION
    MEMORY
      MEMORY
        CATEGORY PER MACHINE TYPE
          MEMORY FOR DOS/V
            MM0437
```

Fig. 24

DISPLAYING MULTIPLE DOCUMENT ABSTRACTS IN A SINGLE HYPERLINKED ABSTRACT, AND THEIR MODIFIED SOURCE DOCUMENTS

BACKGROUND OF THE INVENTION

1. Field of the Invention

The present invention relates to a computerized document processing system for abstracting a computerized document obtained by sending a keyword or the like via a network.

2. Description of Related Art

With the spread of Internet, users are now allowed to readily access information on Internet by using WWW. Then, many individuals and corporations have come to publicly disclose a hyper-text file called a Web page.

However, it has become difficult for each individual user to know where a Web page required by the user is located and to know what should be specified as an URL address to obtain the required Web page.

Then, a system for retrieving accessible Web pages per their contents has been developed for that end and its service has come to be given. That is, such Web retrieve server has allowed a Web page containing a keyword to be retrieved by specifying the keyword. Users have used to retrieve necessary Web pages by using such Web retrieve server.

Hitherto, it has general practice to list a certain amount of document titles, headers or keywords of documents and pages on the upper rank in a retrieve result. Some retrieve server has also registered manually prepared outlines or introductions of pages to present as a retrieved result. Looking at the result, the user has used to determine whether or not to directly make reference to the retrieved page.

Hereinafter, one represented about each document when the retrieved result is thus presented will be referred to as an "abstract" of the document and a page in which "abstracts" of each document are collected will be referred to as an abstract page or an abstract document.

Then, as a method for presenting the retrieved result, it is conceivable to represent a portion where a retrieve word occurs within a retrieved document by KWIC (Key Word In Context). The KWIC representation is a suitable representation method in discriminating a retrieved page in general. However, the KWIC representation is not actually realized for an abstract of a retrieved result of the retrieve server. The reason thereof will be described below.

The presentation of the above-mentioned retrieved result is carried out by one retrieve server. The retrieve server cannot spend much processing time for presenting the retrieved result because it has to respond to retrieve requests of many and unspecified users. Accordingly, the retrieve server presents one which can be generated by a very simple process as the retrieved result. Or, the retrieve server normally uses a method of creating a text to be presented as a retrieved result in advance about one document and of presenting it when the document is retrieved.

Because the KWIC representation is a process requiring more processing amount and because retrieval character strings differ every time when a retrieval is made, it cannot be created in advance. Accordingly, it has not been realized so much.

It is also conceivable to stretch a link from a portion where the KWIC representation is made so that the appropriate portion of the original page may be directly referred in representing by KWIC. However, the original page must be modified in order to stretch the link. It is then conceivable to deal with that by modifying a copy of the document in representing by KWIC while holding the document to be retrieved on a local disk of the retrieve server as it is. However, it is difficult to hold all the Internet documents to be retrieved in terms of capacity. It is also difficult in terms of copy right to modify the copy.

It is also conceivable to obtain a document in the high order of the retrieved result from the site where the document exists and to modify the document to utilize for the KWIC representation. However, because it takes several minutes or more, it cannot be realized for the retrieve server responding to retrieve requests of many users.

Accordingly, it is an object of the present invention to provide a computerized document processing system which allows processes in creating an abstract to be distributed and an original document to be readily modified to relate the abstract with the original document (e.g. link, highlighting of extracted character string and the like) not by generating the abstract document, i.e. the retrieved result, in the retrieve server but by incorporating a module for presenting the retrieved result on the client side or by holding copies of all Web pages in the retrieve server within a local net called Intranet in which there is no problem in terms of copy right and by realizing the KWIC representation by modifying it appropriately.

SUMMARY OF THE INVENTION

According to the present invention, there is provided a computerized document processing system which allows processes in creating an abstract to be distributed and an original document to be readily modified to relate the abstract with the original document.

The computerized document processing system comprises a keyword holding section for holding keywords, document storage section for holding a computerized document transferred via a network, abstract creating section for creating an abstract by extracting at least a character string containing a keyword held in the keyword holding section from the computerized document held in the document storage section, document modifying section for modifying the computerized document such that it can be represented by relating with the abstract created by the abstract creating section, and modified document storage section for storing the computerized document modified by the document modifying section. The computerized document processing system presents the abstract created by the abstract creating section and presents the modified computerized document linked to a predetermined portion of the presented abstract by reading it from the modified document storage section in correspondence to a specification made by a user.

The specific nature of the invention, as well as other objects, uses and advantages thereof, will clearly appear from the following description and from the accompanying drawings.

BRIEF DESCRIPTION OF DRAWINGS

The accompanying drawings which are incorporated in and constitute a part of the specification illustrate presently preferred embodiments of the invention and together with the general description given above and detailed description of the preferred embodiments given below, serve to explain the principles of the invention, in which:

FIG. 3 shows one example of a HTML document which is to be abstracted;

FIG. 4 shows an example of the HTML document in FIG. 3 represented by a standard browser;

FIG. 5 shows one example of the result of the HTML document shown in FIG. 3 to which a pre-processing has been implemented;

FIG. 6 shows one example of a KWIC computerized document;

FIG. 7 shows an example of the KWIC computerized document in FIG. 6 represented by the standard browser;

FIG. 8 shows one example of data stored in a KWIC line register;

FIG. 9 shows one example of data stored in a header line register;

FIG. 10 shows one example of data stored in a head line register;

FIG. 11 shows one example of an abstract document;

FIGS. 18A and 18B show a retrieved result sent from the retrieve server and an example represented by the browser;

FIG. 19 shows one example of the abstract document;

FIG. 20 shows an example of the abstract document shown in FIG. 19 represented by the browser;

FIG. 23 shows an example of representation of the retrieved hierarchical pages, showing an example of representation of page titles extracted from each page;

FIG. 24 shows an example of representation of the retrieved hierarchical pages, showing an example of representation of character strings corresponding to headers extracted from each page;

DETAILED DESCRIPTION OF PREFERRED EMBODIMENTS

Figure 1:
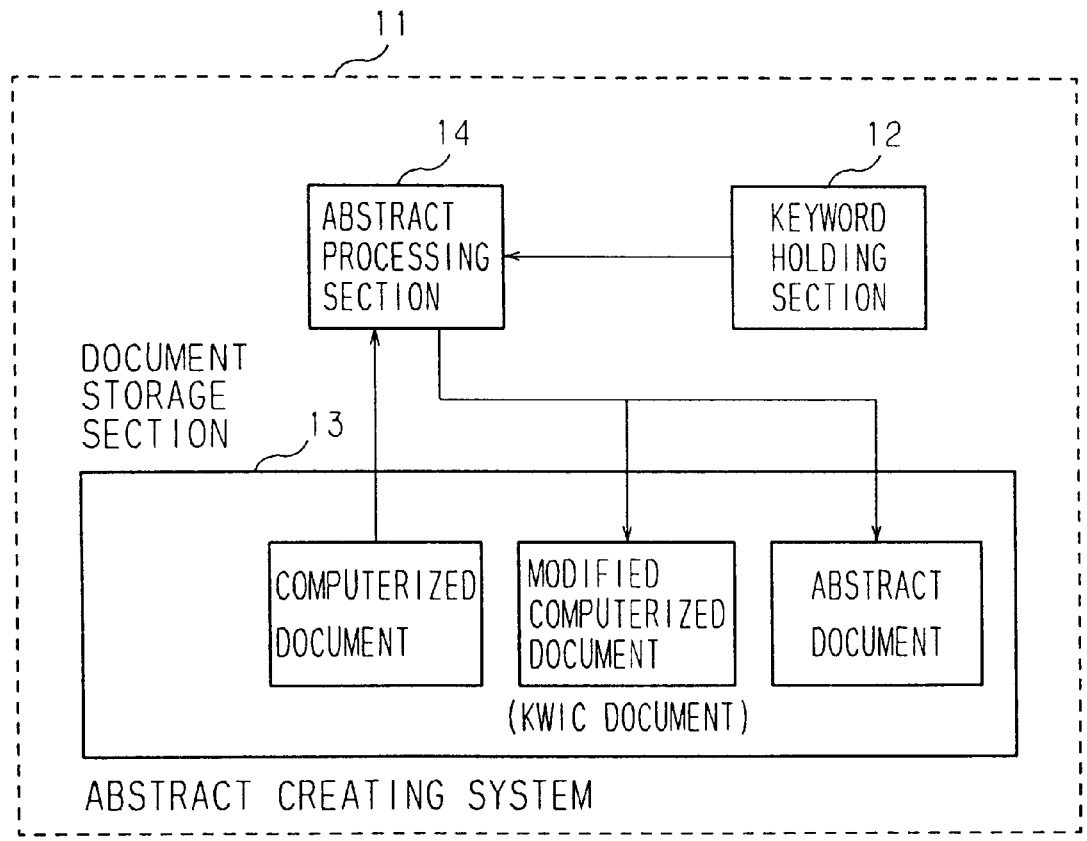
FIG. 1 is a diagram showing an exemplary structure of an abstract creating system according to a first embodiment of the present invention.

Preferred embodiments of the present invention will be explained below with reference to the drawings.

At first, terms used in the following description of the invention will be explained.

'Internet' is a world-wide electronic information communication network which is now spreading.

'HTML (Hyper Text Markup Language)' is an artificial language which prescribes computerized documents or a representation format of computerized documents in particular and which allows a represented document or its location to be quickly changed. A computerized document containing the HTML description is called a HTML document. Each individual HTML description within the HTML document is called a tag in general. The HTML document is also called a Web page or simply as a page occasionally.

The HTML tag is described as a character string put between symbols "<" and ">". The HTML document is a text file. It is noted that the part put between "<" and ">" will be called an inside of the tag hereinafter. One tag is also represented as"<. . . >". Here, while ". . . " is an arbitrary character string, it shall be a character string containing no symbol ">".

'Internet document' is a computerized document which can be accessed, i.e. can be referred or updated, which can be received, i.e. can be obtained, and which can be transmitted, i.e. can be registered via Internet. 'WEB document' and 'WWW document' also have the same meaning. 'WWW document' means specifically a computerized document described by HTML.

'URL (Universal Resource Location)' is a format for describing a location on a network where an Internet document is located and its document name and is document information described by that.

While 'browser' means a system or a software for representing a computerized document, it specifically means a system or a software for representing a HTML document. Normally, the browser is provided with means for obtaining a document described by URL via Internet. The browser analyzes the HTML tag described in each portion in the HTML document and presents each portion by a representation mode specified by the tag.

'KWIC (Key Word In Context)' is one of methods for presenting a retrieved result of a full text retrieved to the computerized document. It is a representation format which represents a retrieve keyword together with character strings before and after that when the retrieve keyword occurs. It brings about an effect that it allows to know by a certain degree that the keyword is used in what kind of context.

'FTP (File Translation Protocol)' is a protocol spread to transmit/receive computerized documents, computerized data and programs via Internet.

'Site' is a location which is one unit in a computer network in terms of a logical structure. Normally, each corporation, academy and public organization composes one site, respectively. Each site has address information assigned per site for communication. The above-mentioned FTP and URL are arranged so as to describe the address information therein.

'Down-load' is an operation for receiving and obtaining a file from a certain site. 'Up-load' is an operation for transmitting and registering a file to a certain site.

'Link' means tagging for quickly changing a represented document or a represented location specifically in the HTML document. "Stretch a link" or "Embed a link" mean to dispose means for quickly changing a presentation to a certain location of a document B in a certain location where a document A is represented. It is realized by inserting a specific tag to the appropriate location of the documents A and B.

Because the portion to which the link is stretched is specially represented by changing a color of characters or by drawing an underline in representing that portion in the document A, the user can understand that there exists the link. Further, because a shape of a mouse cursor changes when a pointing device on the screen called a mouse is placed on an appropriate portion, the user can also understand that there exists the link. Then, when the mouse cursor is placed on the appropriate portion and then the mouse button is clicked, the display is changed to the document B or to a portion linked within the document B.

It is also possible to link to a button or a pattern called an icon within the document A. Stretching the link to a certain character string or a pattern within the document A is called as rendering that portion clickable. Such portion is also said to be clickable.

'Server client system' is a process lately developed on computer networks such as LAN and Internet and is a system for distributing the whole processes by harmoniously advancing the process while communicating between a small number of fast and large capacity computers called a server and having a hardware and software structure per each content of service and a large number of computers called a client responsible for a user interface function of various services in general. A retrieve server described later is a server provided to give a document retrieving service on Internet.

'Home page' means a WWW document prepared per each site. There is a case when each individual prepares a home page.

In general, a home page is a public entry point of a corporation or a group and is a page to which a user who accesses to its site by some intent visits at first. Normally, a link is stretched from the home page to a plurality of pages prepared per low order organization or subject. In such a case, the former page to which the user visits at first is called a top page and the latter low order page is called a sub-page. Normally, the sub-page has a link further to a lower order sub-page and is constructed hierarchically.

'Intranet' is a LAN laid normally per corporation, group and its sub-organization. Security and traffic control are attained in unit of that organization.

'HTTP server' is a computer server on a LAN processing HTTP message communication. The HTTP server receives a HTTP message from a client and transmits/receives a file to/from an external computer based on a inter-computer communication protocol called TCP/IP. The file sent from the external computer is sent to the HTTP client who has requested the file and in the same time, is stored temporarily in a memory area of the HTTP server called a cache. Then, when there is a request to the same file from the same client or from the other client, the file existing in the cache is taken out and is sent to the client unless no specific setting is made. Thus, the file stored once in the cache of the HTTP server is not communicated again between the computer in which the file has originally existed, thus distributing the load of the processing. Further, a time for obtaining the file is shortened by storing it in the cache.

When there exist many client machines within a LAN, the LAN is divided and hierarchized and a server called a PROXY server is provided per each LAN. It is then arranged such that the clients within the LAN transmit/receive a HTTP message to/from each PROXY server, not the HTTP server, and such that only each PROXY server exchanges the HTTP message directly with the HTTP server. Thereby, the load of the HTTP server can be distributed.

It is noted that the following description will be made by exemplifying a case when a computerized document to be retrieved and to be abstracted is a HTML document and a keyword within the abstract created from the computerized document is represented by KWIC.

Further, the abstract created in the following description is a computerized document obtained by shortening the computerized document in order to grasp an outline of the acquired computerized document and comprises a title of the document, a line including a clue phrase, a header line and a KWIC line including a keyword extracted from the retrieved computerized document.

There is a case when the original computerized document modified so as to be linked with the abstract is called a KWIC document.

[First Embodiment]

FIG. 1 is a diagram showing a structure of an abstract creating system according to a first embodiment of the present invention.

In FIG. 1, the abstract creating system 11 comprises a keyword holding section 12, an abstract processing section 14 and a document storage section 13.

The keyword holding section 12 holds keywords used by the abstract processing section 14 in creating an abstract document represented by KWIC.

The document storage section 13 holds a computerized document to be retrieved and to be abstracted, an abstract document created from the computerized document and a document modified to represent by KWIC.

It is noted that the document modified to represent by KWIC will be referred to as a KWIC document hereinafter.

The abstract processing section 14 analyzes a computerized document, e.g. a HTML document, stored in the document storage section 13 to extract character strings before and after a keyword to create an abstract document represented by KWIC and copies and modifies the original computerized document to embed a HTML tag at a location where the keyword occurs within the text so that the keyword part within the document can be perceived. Further, it stretches a link by embedding a specific tag corresponding to the both documents of the abstract document and the KWIC document so that an appropriate location within the original document can be quickly referred from each KWIC representation in the abstract document.

The operation of the abstract processing section 14 of the abstract creating system 11 shown in FIG. 1 will be explained below with reference to a flow chart shown in FIG. 2.

At first, the abstract processing section 14 reads a document to be abstracted as a pre-processing to unify character codes or to divide an extremely long line in Step S1.

While there exist JIS code, SJIS code and EUC code as Kanji codes used in Japanese computerized texts, they are translated appropriately to unify into any one of them. It is also arranged such that no HTML tag is divided, i.e. it is not line-fed between the symbols "<" and ">", in dividing a line and such that no two byte character code is divided.

An algorithm for dividing a line is implemented as follows.

At first, a maximum length N of one line is set in advance. Next, when length of a certain line is N or more, it is determined whether or not the N-th character from the head of the line is an inside of some tag. It is implemented concretely as follows.

Symbols "<" and ">" whose location of occurrence are closest to N are selected among those occurring at the portion less than N letters from the head of the line and their values are set as a and b, respectively. When they do not exist, the value is set as zero.

When a is greater than b, it can be seen that the N-th letter from the head of the line is a location where the symbol "<" has occurred before that and where the symbol ">" does not occur after that occurrence, i.e. that it is the inside of some tag.

When it is determined to be the inside of some tag, the line is divided before the symbol "<" at the location closest to N, i.e. at the point of letter a −1 from the head of the line.

When a =1, i.e. when there exists "<" at the head of the line and the tag exceeds N letters, the line is fed behind the location of "<" which occurs at first counting from the head of the line. In this case, the length of one line exceeds N. The line is fed at the N-th letter from the head of the line when a tag removing system and a tag scope discriminating process which appear in the process thereafter complement to a case in which a line-feed is inserted in the middle of a tag. In this case, the line is fed within the tag.

When a line is divided and length of a character string behind the point where the line-feed has been implemented is more than N, the above-mentioned process is repeated on that. Thereby, the same process is repeated until when a character string after line-feed becomes less than N.

The following processes are repeated on each line after the pre-processing (Steps S2 through S16).

At first, when a line contains tags <TITLE> . . . </TITLE>, a character string between those two tags is extracted as a title and is registered in a title register in Steps S3 and S4. As for the title line, no extraction of KWIC line, clue phrase line, header line and head line is implemented.

There is a case when the tag <TITLE> and the tag </TITLE> do not exist in the same line and several lines exist therebetween. In such a case, a character string within a scope of the tag <TITLE> must be determined and extracted precisely speaking. This process will be described later.

When a keyword held in the keyword holding section 12 is contained in part of the line other than the HTML tag part, a KWIC line counter is incremented to remove the tags contained in the line to extract as a KWIC line and to register in the KWIC line register. Then, tags keyed by a KWIC computerized document name and a KWIC line number registered in the KWIC line counter and a tag specifying highlighting are inserted before and after the keyword part within the KWIC line in Steps S5 and S6.

There is a case when a keyword exists while straddling lines. Then, in order to prevent its extraction from being omitted, such keyword is detected from a line in which a previous line temporarily held is connected with a current line. When a plurality of keywords are contained, the same process is implemented on each keyword.

Next, when a clue phrase is contained in part of the line other than the HTML tag part, a clue phrase line counter is incremented to remove the tag contained in the line to extract as a clue phrase line and to register in the clue phrase line register in Steps S7 and S8.

A clue phrase is a word, an idiom or a phrase in general which occurs before or after an important part of a document and which is often contained in a text showing an outline of the page. They include, for example:

"Welcome to"

"In this home page"

"In our company", and the like.

It is helpful to extract a sentence containing a word or a representation like the clue phrase and to present it within the abstract document to understand the outline of the document.

Next, a tag contained in the line or a tag in which the line is in the scope thereof is checked. When the tag is a header, a header line counter is incremented to remove the tag contained in the line to extract as a header line and to register in the header line register in Steps S9 and S10.

HTML showing that one is a header line include, for example:

<H1> . . . </H1>
<H2> . . . </H2>
<H3> . . . </H3>
<STRONG> . . . </STRONG>
<BIG> . . . </BIG>
<EM> . . . <EM>

It is noted that the scope of tag will be described later.

Removing the tags means to delete a portion interposed between the symbols "<" and ">" within a character string of a line, together with those symbols.

The following exceptional process is executed in removing the tags.

Although a long line is divided in the pre-processing so that the line is not divided in the middle of a tag, i.e. so that the line is not divided in the middle of the portion interposed between "<" and ">", there is a case when a line is divided within a tag when the tag is extremely long. In this case, the line is divided into two lines of " . . . <$" and "^ . . . >". Here, " . . . " is an arbitrary character string containing no symbols "< . . . " and ">" and the symbols "$" and "^" are expedient symbols for showing the last of the line and the head of the line, respectively. In such a case, the character string "< . . . $" of the line " . . . < . . . $" is removed and the character string "^ . . . >" of the line "^ . . . >" . . . is deleted in removing the tags.

Next, a head line counter is incremented unconditionally until reaching a predetermined fixed letter amount (threshold value) from the head of the document to remove the tags from the line, to extract as a head line and to register in a head line register in Steps S11 and S12. At this time, it is not extracted when no letter remains when the tags are removed. The title line is not also extracted.

The fixed letter amount is N×M, wherein M is a number of letters of one line which can be represented in representing by standard fonts of a standard browser for example and N is a number of lines presented as an abstract of one document.

When there is no restriction on a storage device such as a memory, the character string from which the tags have been removed are registered in the head line register for all the read lines. This case will be explained in the following description.

Next, the read lines are output as a KWIC computerized document in Steps S13 through S15. While this KWIC computerized document is almost the same with the original computerized document, the HTML tags are embedded before and after the keyword to specify to represent the keyword by bold or large fonts, by reversed white letters, by italic or by adding an underline so that the keyword portion within the document is highlighted when it is represented. The HTML tag which indicates a destination of link from the abstract document is also embedded. What is presented when the user reads the abstract document and refers to the original page via the link embedded within the abstract document is the KWIC document.

As for a line containing a keyword, it is output by inserting tags keyed by the KWIC line number registered in the KWIC line counter and tags specifying highlighting before and after the keyword in the line. As for a line containing no keyword, the line is output as it is after the end of the pre-processing.

After reading all the lines of the document and extracting the header line, the clue phrase line and the KWIC line as described above, a certain number of lines are selected from the extracted lines under the criterion described below to output as an abstract of the document in Steps S17 and S18. The process for selecting lines to represent as the abstract is an output adjusting process.

The output adjusting process will be explained below. It is noted that in the following explanation, a number of letters of one line which can be represented by the standard fonts of the standard browser shall be denoted by M and a number of lines presented as an abstract of one document shall be denoted by N.

When the total of number of letters, except of tags, of the lines extracted as KWIC is M×N or more, the KWIC lines are selected from the head of the KWIC line register, i.e. from ones whose original line number is small, so that the total number of letters settles within M×N. When the total number of letters of the lines extracted as the KWIC lines is less than M×N, all the extracted KWIC lines are selected.

When there is a remainder beside a value obtained by dividing the total number of letters of the line thus selected by M, a value added by "1", i.e. a number of lines on the display when those lines are combined to display as one line, is set as K.

When K is less than N, the selection is made from the header line.

The selection is made from the head of the header line register, i.e. from those whose original line number is smaller, so that the total number of letters of the part except of the tags settles within M×(N−K). When the total number of letters is less than M×(N−K), all the extracted header lines are selected.

When there is a remainder beside a value obtained by dividing the total number of letters of the line thus selected by M, a value added by "1", i.e. a number of lines on the display when those lines are combined to display as one line, is set as L.

It is noted that lines which have been already selected from the KWIC line register are not selected in selecting from the header lines to avoid the same portion from being represented by a plurality of times as an abstract of a document and to display different portions as much as possible because an amount of lines which can be represented as the abstract of one document is limited.

When K−L <N, the selection is made from the head line. The selection is made from the head of the head line, i.e. from those whose original line number is smaller, so that the total number of letters settles within M×(N−K−L). In selecting from the head line, the lines which have been already selected from the KWIC line or the header line are not selected.

The selection of a clue phrase line is made as follows.

Because a clue phrase line often implies an outline of the whole document, it is preferable to display it after a display of document title of each document within the abstract document. Normally, a link to the original document is embedded here so as to jump to the original document when this portion is clicked. The extracted clue phrase line is selected from the head, i.e. from those whose clue phrase line number is smaller, so that the number of letters settles within about M−L, where L is a number of letters of the document title.

Tags for adjusting the representation format are added to the KWIC line, the header line, the clue phrase line and the title line thus selected to output to the abstract document.

A process of the above-mentioned abstract processing section 14 will be explained below based on an example of an abstract of a document.

FIG. 3 shows one example of a HTML document which is to be abstracted. In FIG. 3, "< . . . >" is a HTML tag. FIG. 4 shows an example of the document in FIG. 3 represented by the standard browser. FIG. 5 shows each line after implementing the pre-processing to the HTML document shown in FIG. 3. Line numbers are added at the left edge of the lines for the purpose of explanation. Lines from the 5-th line through the 17-th line or from the 25-th line through the 28-th line are lines produced due to the division of line. Extraction of the header line, clue phrase line, KWIC line and head line is implemented to each of these lines.

Assume that two words of "Internet" and "Intranet" for example are registered in the keyword holding section 12 as keywords.

Because no tag indicating an equivalence of header nor clue phrase and keyword exists in the first line, it is not extracted as a header line, a clue phrase line or a KWIC line. Because no letter is left when the tag is removed, it is not extracted also as a head. The first line is output to the KWIC document as it is.

The second line is a tag showing an equivalence of a header. Because there exists a tag "<TITLE>", it is registered in the title line register by removing the tag. Because the second line is a title line, extraction of KWIC line, clue phrase line, header line and head line is not implemented. The second line is output to the KWIC computerized document as it is.

Because the lines from the third line through the 19-th line are part composed of only tags, they are not extracted as a header line, clue phrase line or KWIC line. Each line is output to the KWIC computerized document as it is.

Because the 20-th line contains the keyword "Internet", link tags keyed by a KWIC document name and a KWIC counter value are inserted before and after the character string "Internet" after removing the tag by incrementing the KWIC line counter to register in the KWIC register.

In concrete, assuming the document name of the KWIC document as "mod.html" for example, it is registered in the KWIC line register by inserting a tag "<AHREF="mod.html#KWIC1><B>" and a tag "</B></A>" before and after the character string "Internet". Here, "1" in "KWIC1" is a value of the KWIC counter.

Because the 20-th line is a scope of tag <H1> of the previous line, it is registered in the header line after removing the tag part by incrementing the header line counter.

Here, the scope of the tag is a character string part within the document, other than the HTML description part, in which a specification such as a representation format specified by the tag is applied. Among HTML tags, there are two kinds of tags having no scope and having a scope. For instance, "<BR>" is a tag having no scope and has an effect of urging line-feed at the location thereof when it is displayed when its document is displayed. For instance, "<H1> . . . </H1>" is a tag having a scope and specifies to display the character string between them by the usable largest fonts. The latter tag having the scope is more general in HTML and is normally designated by two corresponding tags of "<AAA> . . . </AAA>" (AAA is a character string). Generally, the former tag <AAA> is called a begin tag and the latter tag </AAA> is called an end tag.

Thus, there is a case when a line sequentially read is a scope of the HTML begin tag contained in the line previously read. Accordingly, it is necessary to memorize that the current line is a scope of which HTML tag contained in a previously read line and to adequately process it.

Further, when there is the begin tag or the end tag in the middle of a read line, a character string before the begin tag or after the end tag is not a scope of those tags. Because extraction of the header line is carried out by extracting a character string which is in a scope of a specific tag, a character string out of the scope is excluded even it exists in the same line.

Because this process has been realized by the existing versions generally called as SGML parser or HTML parser, i.e. the syntax analysis technology, it will not be described further in detail.

The 20-th line in FIG. 5 is registered in the head line register as a head line after removing the tag part by incrementing the head line counter.

By the way, because the 20-th line has been a KWIC line, it is output to the KWIC computerized document by inserting tags "<ANAME="KWIC1"><STRONG>" and "</STRONG>" before and after the keyword "Internet". "1" in "KWIC1" is a value of the KWIC line counter.

Because the 21-st line contains the keyword "Intranet", it is registered in the KWIC register by inserting link tags keyed by the KWIC counter value before and after the character string "Intranet" after removing the tag by incrementing the KWIC line counter. In concrete, assuming the document name of the KWIC document as "aaa.html" for example, it is registered in the KWIC line register by inserting a tag "<AHREF="aaa.html#KWIC2><B>" and a tag "</B></A>" before and after the character string "Intranet". Here, "2" in "KWIC2" is a value of the KWIC counter.

Because the 21-st line is a scope of tag <H1> of the previous line, it is registered in the header line after removing the tag part by incrementing the header line counter.

The 21-st line is registered in the head line register also as a head line after removing the tag part by incrementing the head line counter.

By the way, because the 21-st line has been a KWIC line, it is output to the KWIC computerized document by inserting tags "<ANAME="KWIC2"><STRONG>" and "</STRONG>" before and after the keyword "Intranet". "2" in "KWIC2" is a value of the KWIC line counter.

FIGS. 8, 9 and 10 show examples of contents of the KWIC register, the header line register and the head line register, respectively, after processing all the lines as described above. The first columns in FIGS. 8 through 10 are the KWIC line number, the header line number and the head line number, respectively, and the second column is the line number within the original document of that line.

It is noted that because no clue phrase has occurred in this sentence, the clue phrase register is empty.

FIG. 6 shows the KWIC computerized document. This document is represented as shown in FIG. 7 by the standard browser. It can be seen that the keywords "Internet" and "Intranet" are presented in gothic as compared to the original document in FIG. 4.

Next, the output adjusting process will be described.

It is noted that a number of letters which can be represented by the standard font of the standard browser is assumed to be 63 letters and a number of lines represented as an abstract of one document is 15 lines (Japanese em-size letters are counted as two letters of ASCII character).

Because a number of letters of the lines registered in the KWIC line register, except of those of the tags, is 463 and is less than 63×15, all of them are selected. Because 463/63=7 and the remainder is 22, a number of lines K necessary for displaying them is 8.

Next, the selection is made from the header line.

Because the lines of the header line number 2 and 3 have been already selected as the KWIC lines, they are not selected. Because a total number of letters of the remaining lines, except of those of the tags, is 50 and 50<63×(15−8), the remaining lines, i.e. the lines of the header line number 4, 5 and 6, are all selected. Because 50/63=0 and the remainder is 50, a number of lines L necessary for displaying them is 1.

Next, the selection is made from the head line.

When the lines are selected so that a number of letters settles below 63× (15−8−1) by jumping the lines already selected as the KWIC lines or the header line, four lines of the head line number 4, 7, 9 and 10 are selected.

FIG. 11 shows what is output as an abstract by adding tags for adjusting the representation format to those selected lines and the title line. It is represented by the browser as shown in FIG. 12 for example.

Figure 12:
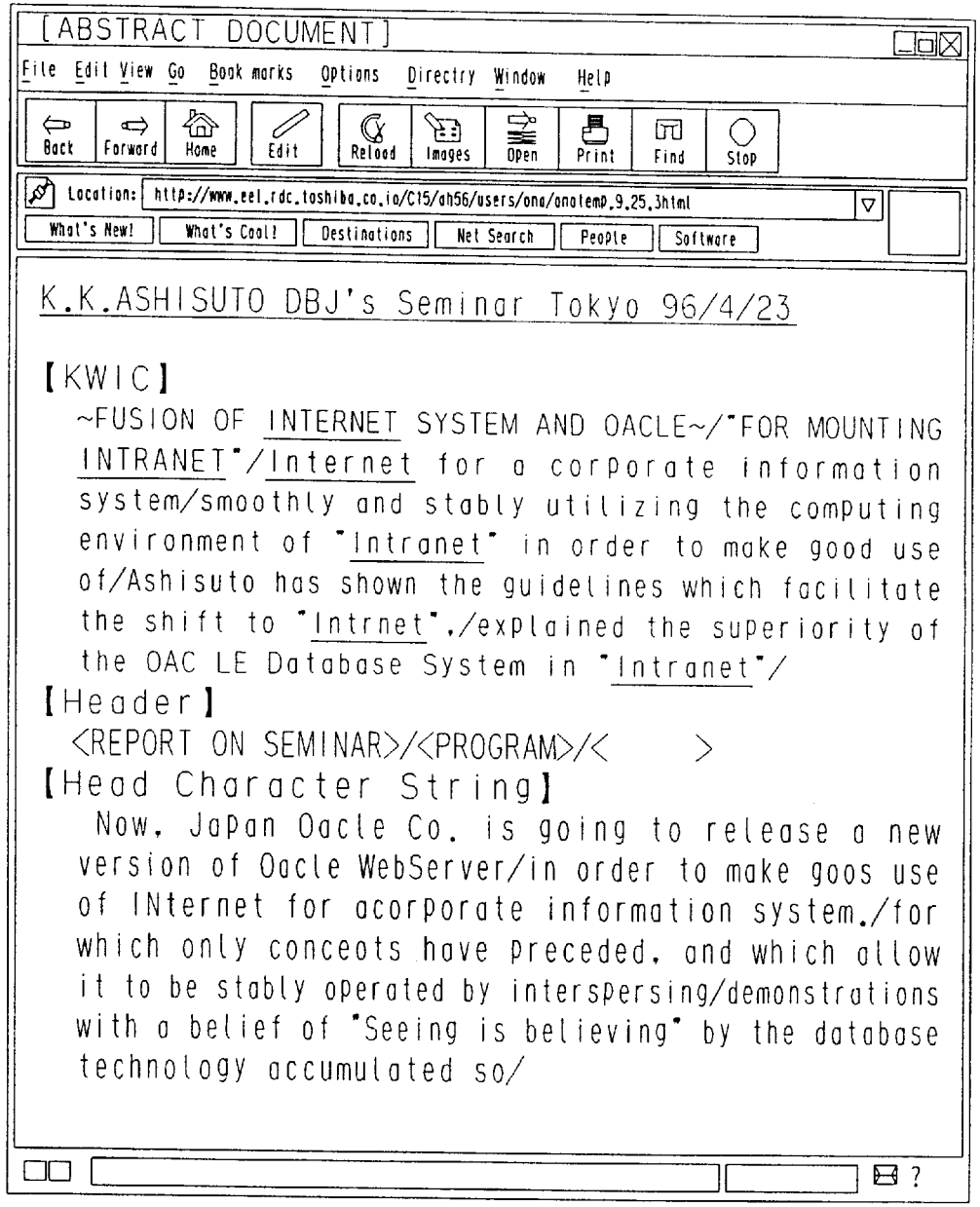
FIG. 12 shows an example of the abstract document in FIG. 11 represented by the standard browser.

In FIG. 12, the first line is the extracted title line. A link is embedded such that the display is changed to the KWIC document when this portion is clicked. Further, the selected KWIC line, header line and head line are represented with headers of "KWIC", "Header" and "Head Character String", respectively. Each selected line is represented by connecting into one line through the intermediary of a symbol "/". This is a format adopted in order to display many letters within a limited space. It is of course conceivable to feed line per each line and to display as another line.

Figure 14:
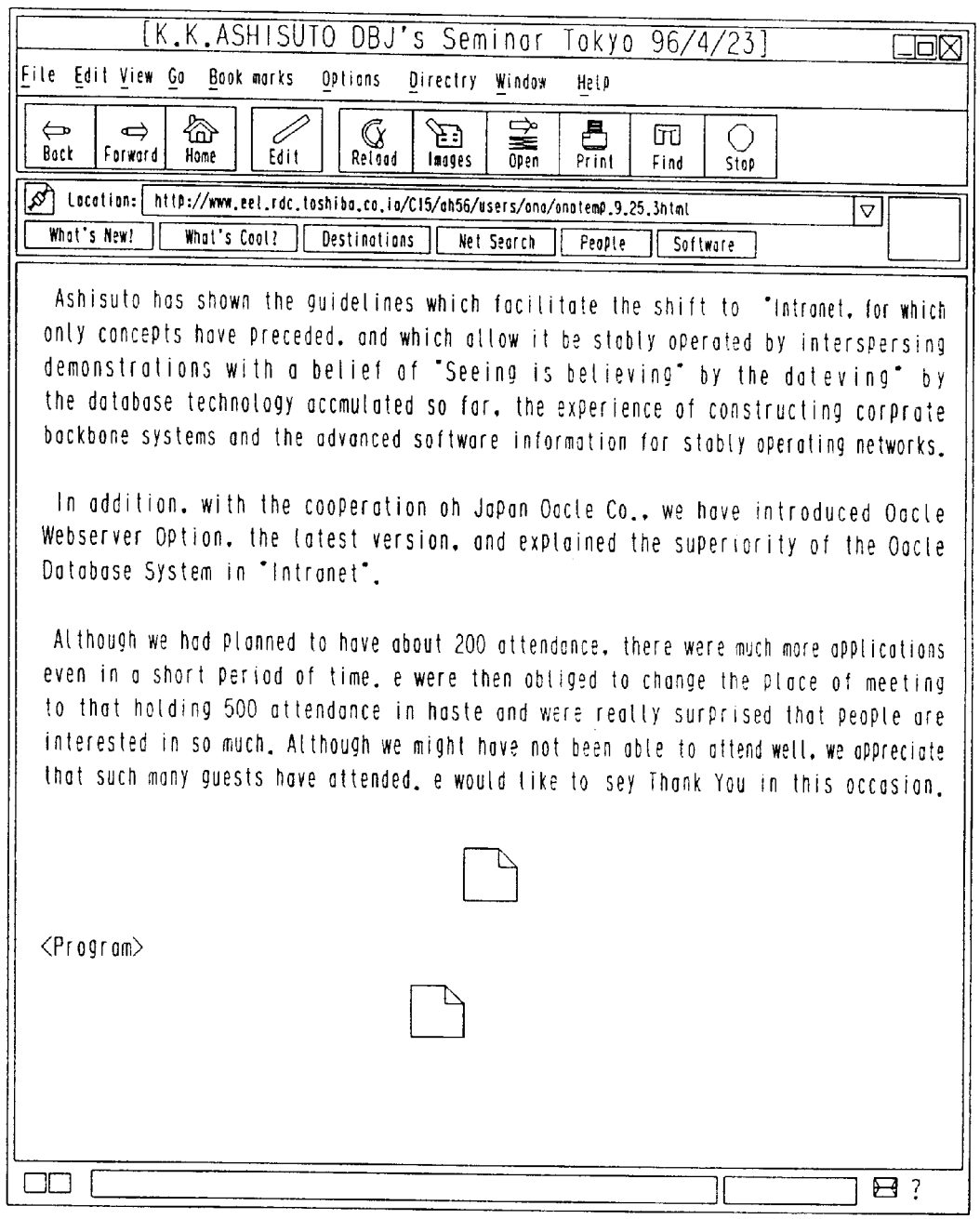
FIG. 14 shows an example of representation of a KWIC document linked to the abstract document shown in FIG. 12.

"Internet" and "Intranet" indicated by bold letters in the display in FIG. 12 are clickable and links to corresponding portion of the KWIC document are embedded therein. For instance, when the mouse cursor is placed at the letter portion of "Intranet" in the fifth line and the mouse button is pressed, i.e. is clicked, the display is changed instantly to the portion where a tag <ANAME="KWIC5"> is embedded in the document with a file name mod.html, i.e. in the KWIC document because a link <AHREF="mod.html#KWIC5> is being embedded in that portion. That is, the display is changed as shown in FIG. 14.

Thus, the display may be changed instantly from the KWIC representation within the abstract document to the appropriate portion of the original corresponding to the KWIC portion.

It is noted that although no clue phrase has occurred in the present embodiment, it is preferable to output it after the title line when it exists.

Figure 13:
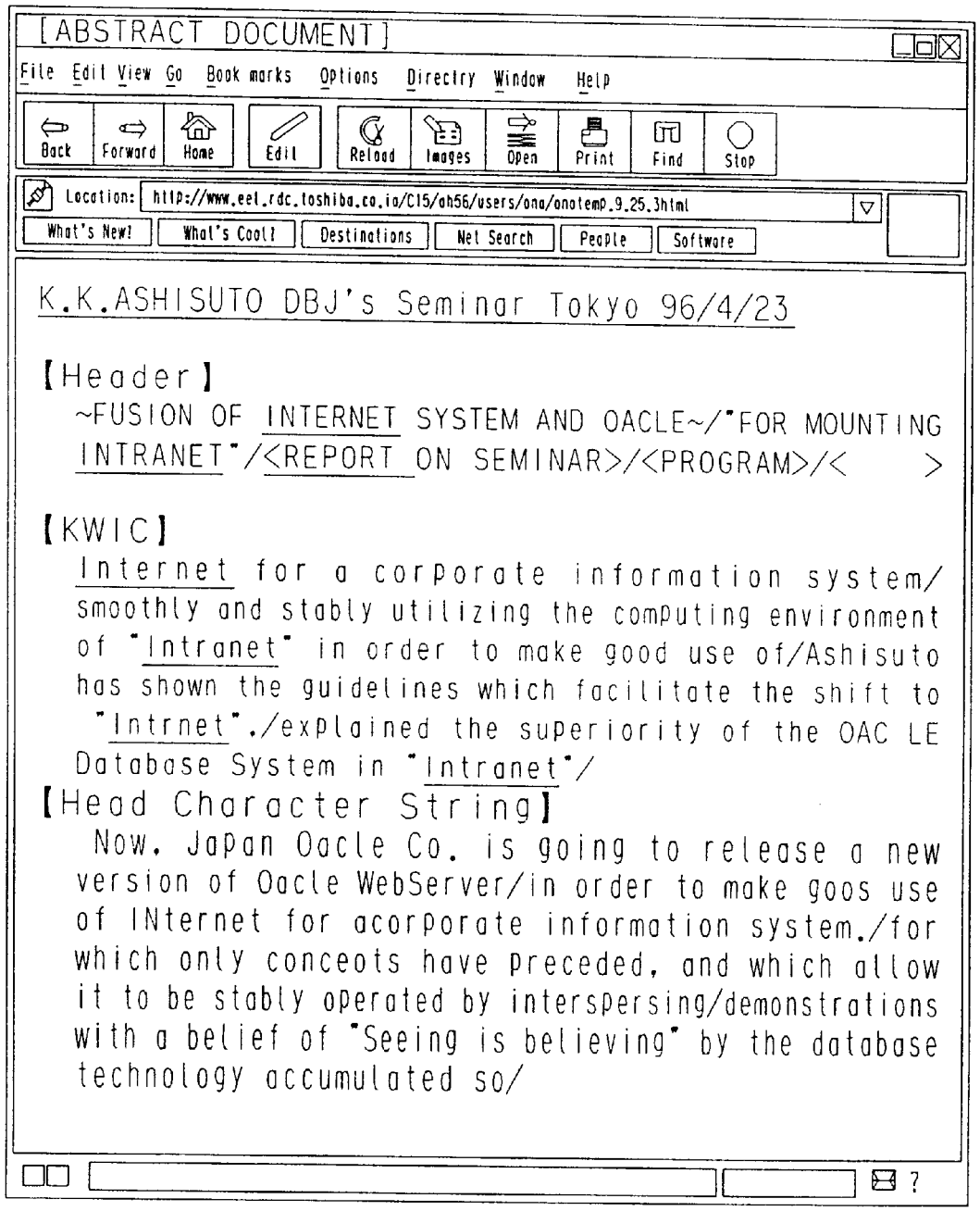
FIG. 13 shows another example of the abstract document represented by the standard browser.

Further, when the same line is extracted as both KWIC and header lines, although it is represented as a KWIC line in the present embodiment, it is conceivable to display it as a header line. FIG. 13 shows an example of display of that case.

It is also conceivable as a variation of the present embodiment to output a certain number of letters before and after a keyword, not outputting the very line in which the keyword is found as KWIC.

In this case, when the keyword is located at the position close to the end of a line, letters at the end of the line and at the head part of the next line are displayed. When the keyword is located at the position close to the head of a line, letters at the end of the previous line and at the first half of the line are displayed.

Further, it is conceivable to define a character string displayed before or after the keyword as KWIC to be a character string until an end of a sentence such as a period or a symbol indicating a delimitation.

[Second Embodiment]

The abstract creating system 11 described in the first embodiment is embodied as one module within the retrieve server or the retrieving client.

Next, as a second embodiment of the present invention, a case of constructing the computerized document processing system by mounting the abstract creating system shown in FIG. 1 within the retrieving client will be explained.

Figure 15:
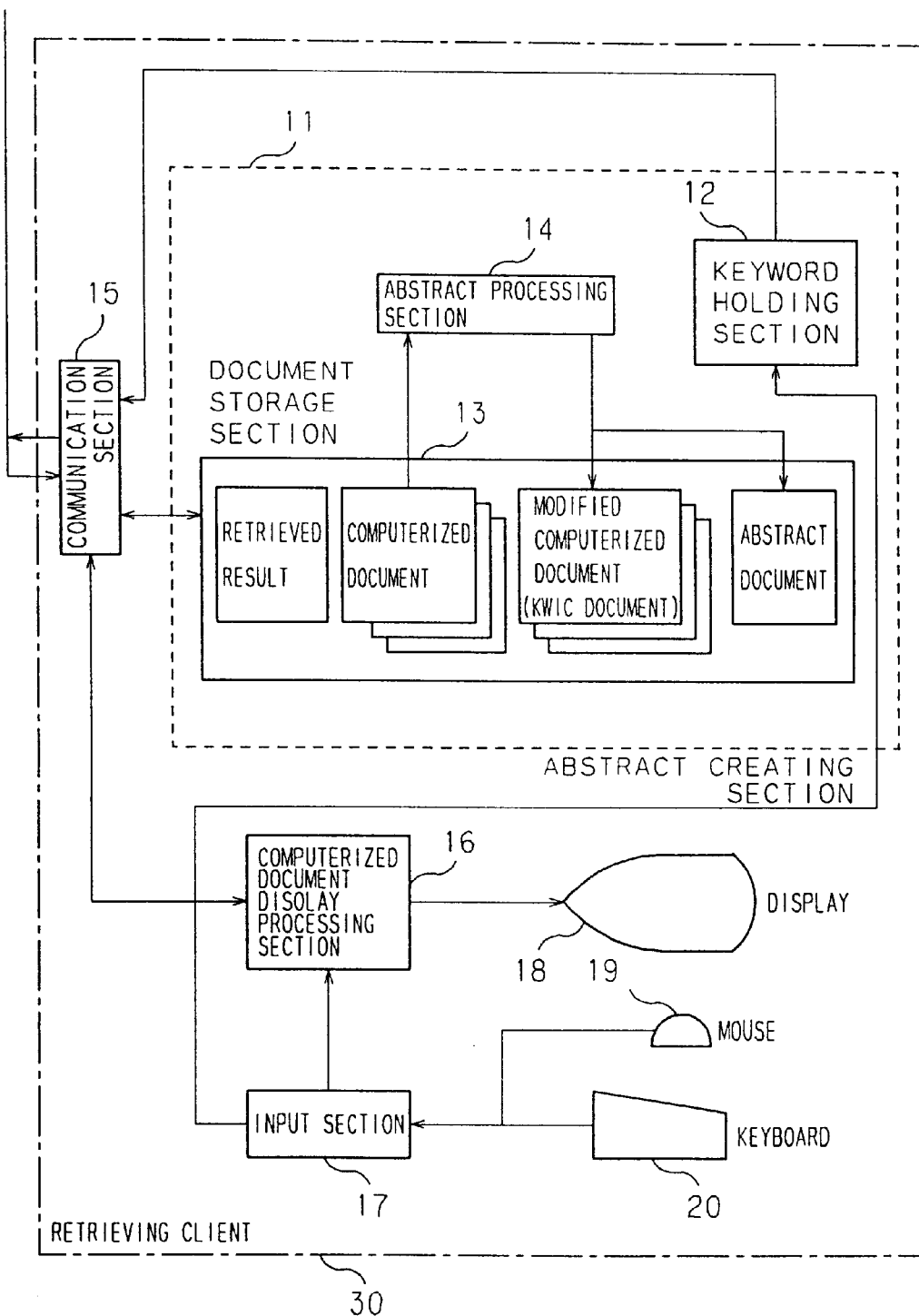
FIG. 15 is a diagram showing an exemplary structure of a retrieving client in the computerized document processing system according to a second embodiment of the present invention.
Figure 16:
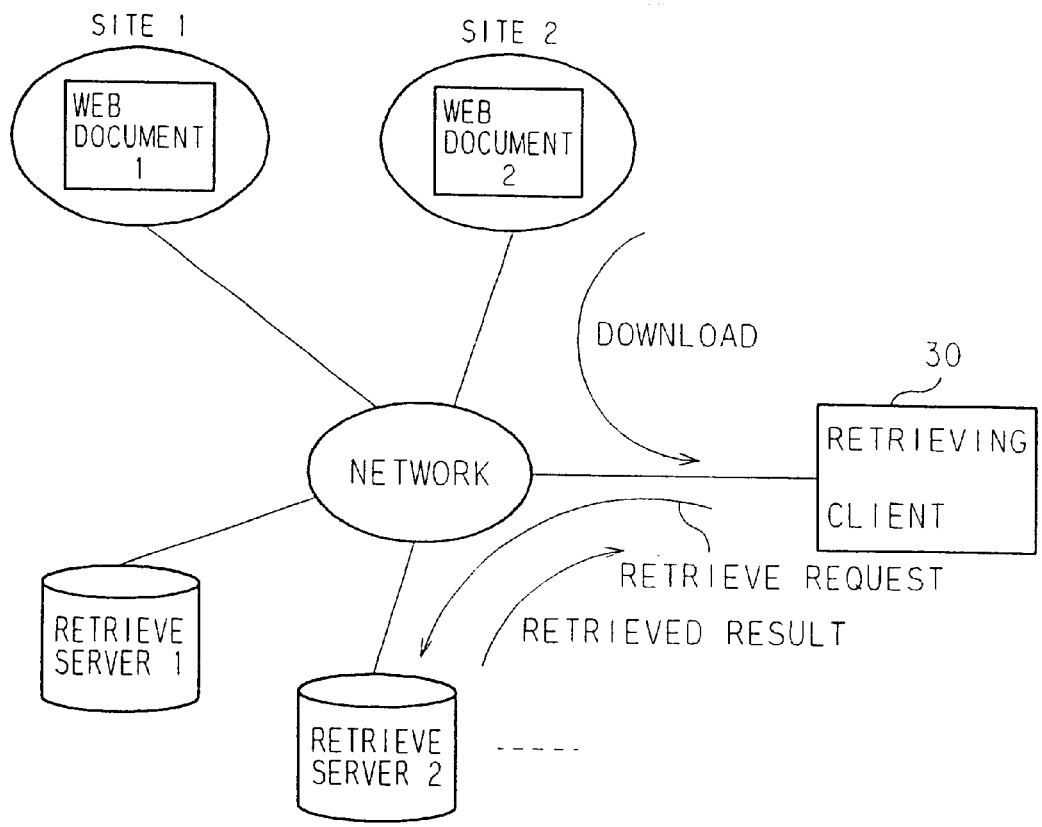
FIG. 16 is a diagram showing one example of a network environment of the retrieving client in FIG. 15.

FIG. 15 shows an exemplary structure of the client system according to the second embodiment. It is noted that the retrieving client shown in FIG. 15 is supposed to be used in a network environment as shown in FIG. 16 for example.

In FIG. 15, the retrieving client system 30 comprises a computerized document display processing section 16, a display 18, a keyboard 20, a mouse 19, an input section 17 and a communication section 15, in addition to the document storage section 13, the keyword holding section 12 and the abstract processing section 14 shown in FIG. 1. It is noted that the same components with those in FIG. 1 are denoted by the same reference numerals and are surrounded by a dotted line. This part will be called as an abstract creating section hereinafter.

Beside three types of documents of a plurality of computerized documents to be abstracted, those computerized documents which have been modified to represent by KWIC and created abstract documents, the document storage section 13 also holds a retrieved result comprising a name of a computerized document whose retrieved result sent from another retrieve server is ranked, its location data on a network and its abstract.

The computerized document display processing section 16 corresponds to the browser described before. The keyboard 20 and the mouse 19 will not be explained here specifically. The input section 17 is a processing section for transmitting an input from the keyboard or the mouse to the communication section 15, the document storage section 13 or the like. It is a part of the OS. The display 18 may be an ordinary CRT or the like.

The communication section 15 is connected with a network such as Internet and LAN and is capable of transmitting/receiving information by the above-mentioned HTTP or FTP protocol for example.

Figure 17:
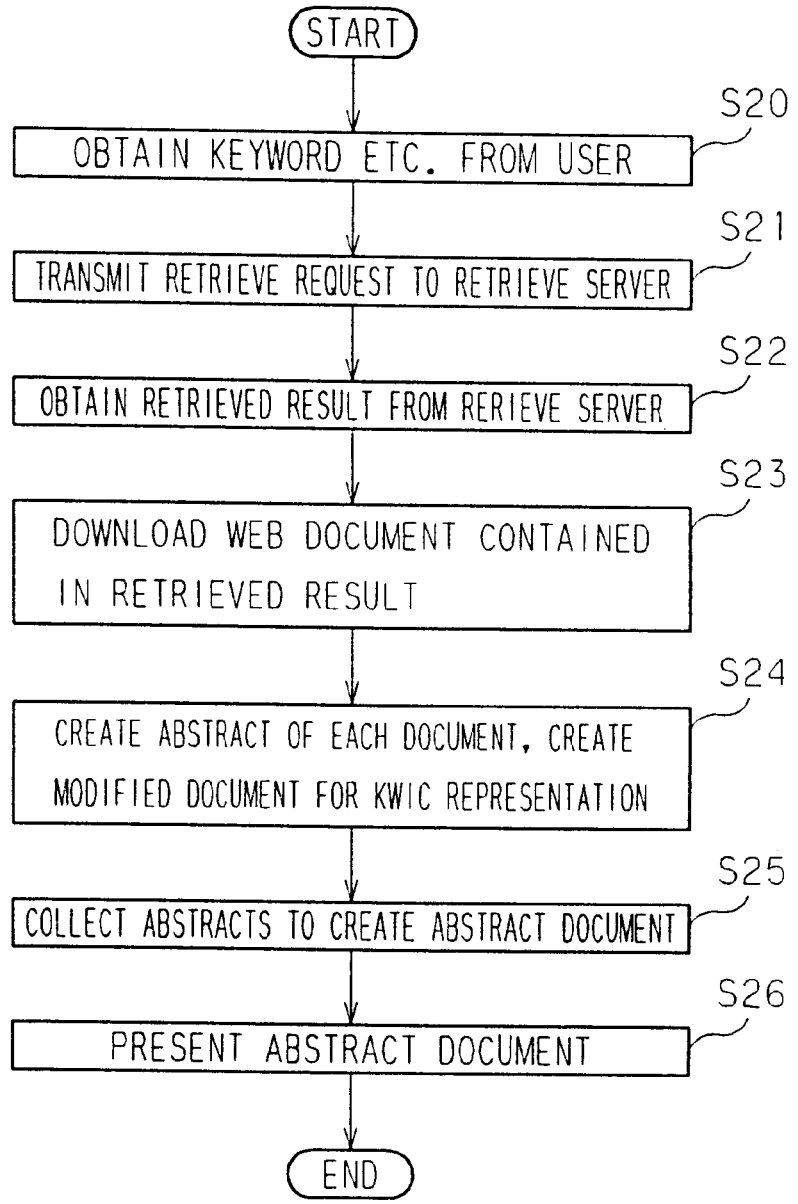
FIG. 17 is a flow chart showing a procedure for creating an abstract in the retrieving client in FIG. 15.

Next, the whole processing operation of the retrieving client system shown in FIG. 15 will be explained with reference to a flow chart shown in FIG. 17.

At first, the system presents an adequate prompt or a screen display to obtain a retrieve keyword from the user and registers it to the keyword holding section 12 in Step S20. Beside the retrieve keyword, the system receives their retrieving condition (AND retrieval, OR retrieval, etc.), a range of documents to be retrieved (within or without, period, etc.) and a specification of a retrieve server to which the retrieval is requested. It is of course preferable to set default values for those retrieve keyword, retrieving condition, scope of documents to be retrieved and specification of retrieve server in advance and to change the data only when the user specifies its change.

Next, the system sends a retrieve request to the retrieve server via Internet in Step S21. In concrete, it sends the data of retrieve keyword, field and type of document to be retrieved and period in a predetermined form. That is, it sends the data of peculiar format and period to each retrieve server. Because each retrieve server has a peculiar format, the data is sent by HTTP by modifying so as to conform to the format per each retrieve server.

Next, the system holds the retrieved result sent from the retrieve server in the document storage section 13 in Step S22.

FIG. 18A shows an example of the retrieved result sent from the retrieve server. This HTML document is represented as shown in FIG. 18B when it is represented normally by the browser.

Next, a Web document ranked in the retrieved result is downloaded from each site where they exists in Step S23. The downloaded Web document is held in the document storage section 13.

Next, the abstract creating system 11 creates an abstract of each document by utilizing the keyword held in the keyword holding section 12 by the method described in the first embodiment. In the same time, the abstract creating system 11 generates a KWIC computerized document for KWIC representation in Step S24. Then, the abstracts created per each document are collected into one abstract document in Step S25.

FIG. 19 shows an example of the abstract document thus created. This HTML document is represented as shown in FIG. 20 by the browser.

While the operation of the retrieving client system 30 containing the abstract creating system 11 has been described above, the following system is conceivable as a variation of the above-mentioned retrieving client system 30.

Figure 21:
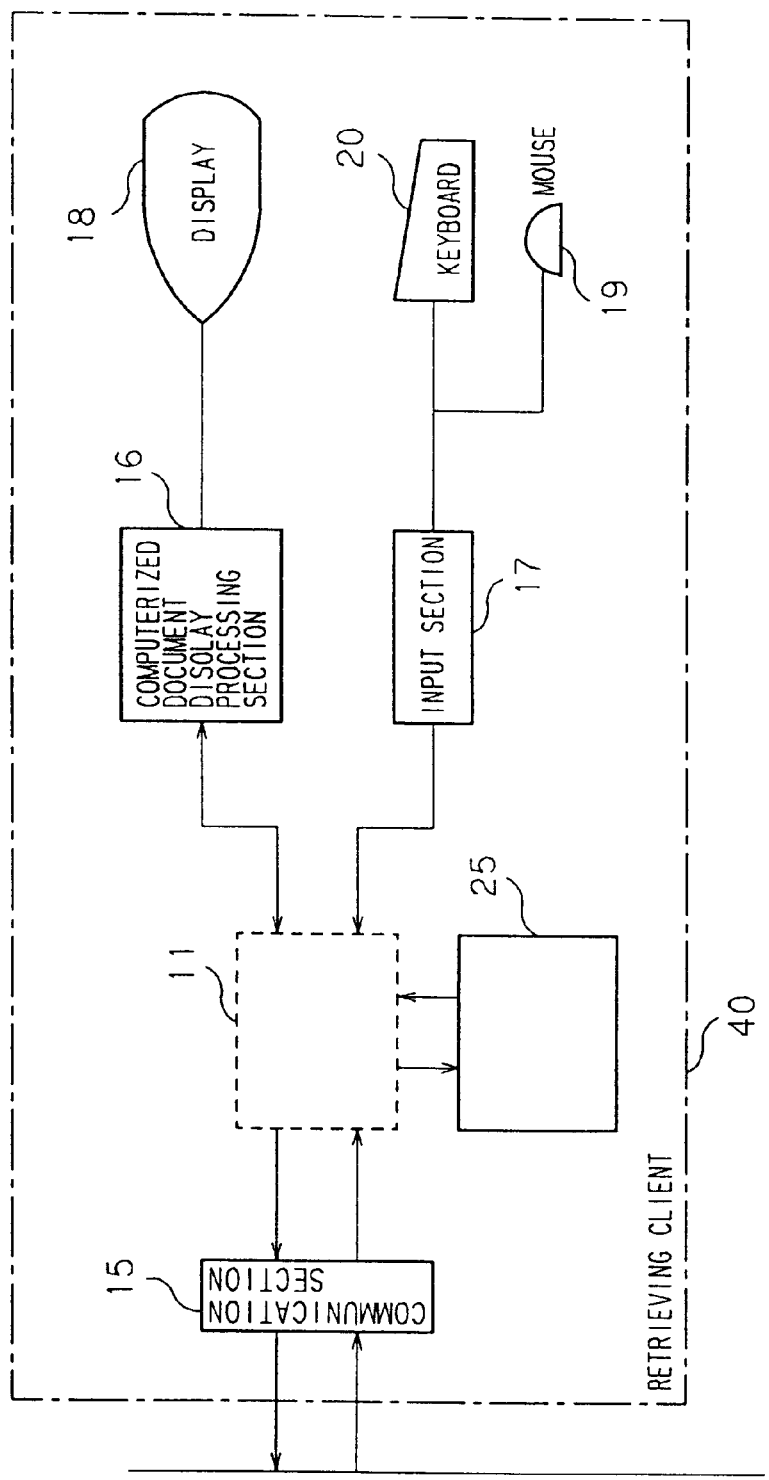
FIG. 21 is a diagram showing another arrangement of the retrieving client of the computerized document processing system.

For instance, as shown in FIG. 21, it is conceivable to construct a retrieving client system 40 in which a processing section called a retrieved result merging section 25 is added to the arrangement shown in FIG. 15. The retrieving client system 40 shown in FIG. 21 transmits a retrieve request to a plurality of retrieve servers after obtaining the keywords and holds a plurality of received retrieved results in the document storage section 13.

Next, the retrieved result merging section 25 merges those retrieved results to generate one article ranking. There are various ways how to merge them. For instance, it is conceivable to rank an article contained in a plurality of retrieved results at higher rank or to take an average of ranking. Or, it is conceivable to precede a document which has been created/registered more recently. Thereby, a more accurate article ranking may be obtained.

The processes thereafter are the same with those described before.

It is noted that although the processes of the abstract processing section 14 have been explained such that the abstracts of all the documents are created in accordance to the merged ranking, some retrieve server sends each retrieved document as a retrieved result by appending an abstract manually created. When the document contained in the retrieved result from this server is contained in the ranking after the merge, it is conceivable to have a system of displaying the transmitted abstract as it is as an abstract, without creating a new abstract for that document, and of creating an abstract only for a document not contained in the ranking after the merge.

Further, the following method is conceivable as another variation.

When a retrieved page is a sub-page, titles and headers of chapters and sections of the intermediate pages from the top page to that page are represented hierarchically. In this case, the intermediate pages from the retrieved page to the top page are obtained at first as follows.

When there exists a link "return to" in the middle (or the end in particular) of the retrieved page, it implies a higher order page or the top page. Then, that page is downloaded and when it is not the top page, the same process is implemented to that page. Thus, the link "return to" is followed until reaching to the top page.

Or, when a number of directories contained in location data (URL) of a document which is the destination of jump of a link embedded in the retrieved page is smaller than a number of directories of URL of the present page, that page is judged to be a page in a higher order hierarchy. Thus, the higher order page may be detected.

It is possible to determine whether a page is the top page or not from an address of URL. Normally, URL of the top page assumes a shape of "http://aa.bbb" or "http://aaa.bbb/index.html". Here, "bbb" is what is used in Japan and is prescribed as "co.jp" for companies, as "ac.jp" for academies and as "or.jp" for public organizations for example.

A sub-page has a form of "http://aaa.bbb/ccc/ddd/eee.html". An area delimited by "/ . . . /" is called a directory in general. It can be seen that URL of the sub-page is located at the position which is lower by two directories from the URL of the top page in the above example.

When the top page is reached, the title of each page and the headers of chapters and sections in which the link is located within the page belongs are extracted sequentially from those pages whose order is higher.

Figure 22:
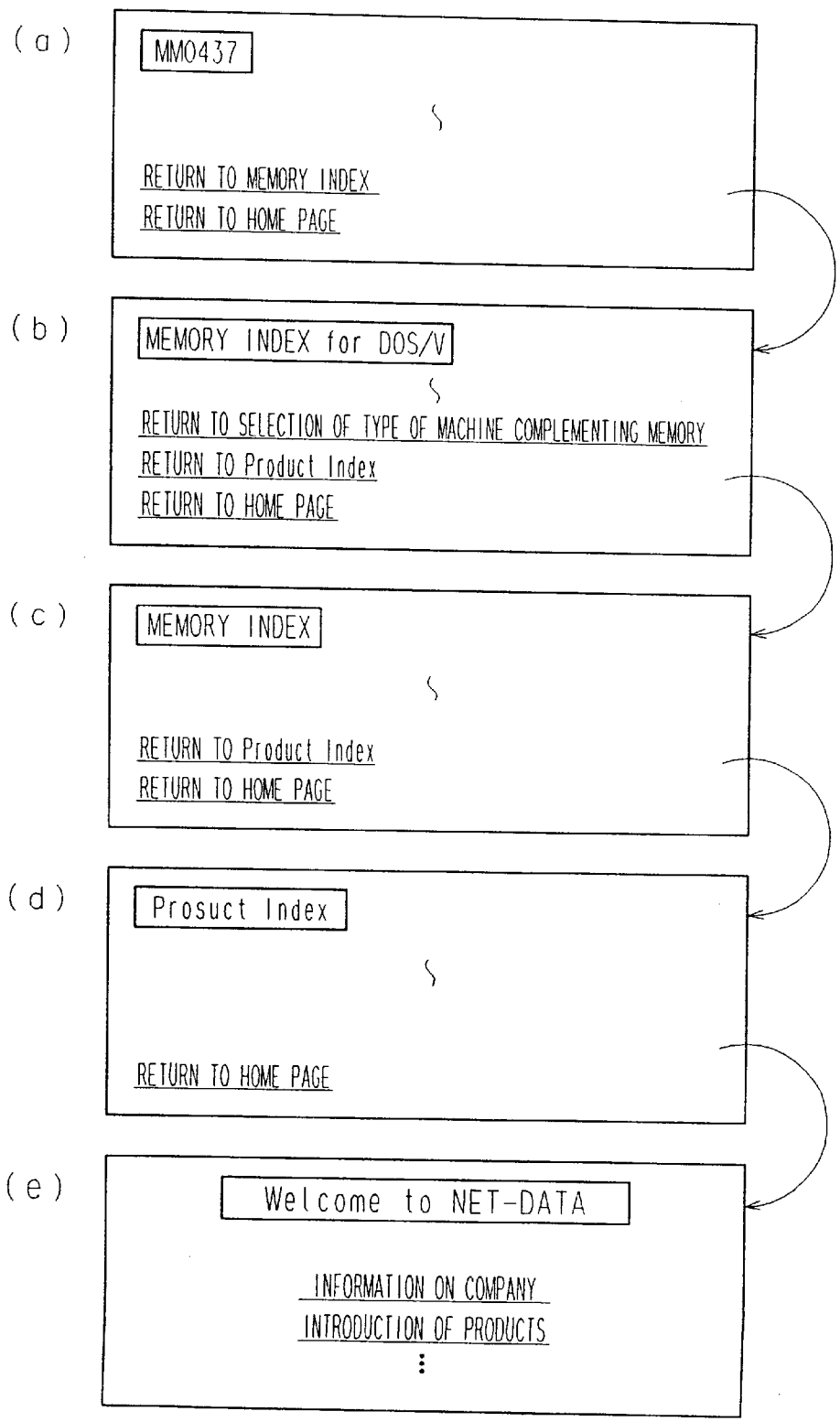
FIGS. 22A through 22E explain a method for hierarchically retrieving pages from a sub-page of a retrieved computerized document till a home page linked thereto.

An example of the analysis will be explained below with reference to FIG. 22. FIG. 22A shows a retrieved page, FIG. 22B shows a page whose order is higher than that in FIG. 22A by one level, FIG. 22C shows a page whose order is higher than that in FIG. 22B by one level, FIG. 22D shows a page whose order is higher than that in FIG. 22C by one level and FIG. 22E shows a page whose order is higher than that in FIG. 22D by one level, i.e. the top page (home page).

There is a description "Return to MEMORY INDEX" at the end of the HTML document shown in FIG. 22A and the destination of the link is the HTML document shown in FIG. 22B. Similarly, there is a description "Return to selection of type of machine complementing memory" at the end of the HTML document shown in FIG. 22B and the destination of the link is the HTML document shown in FIG. 22C. It is then possible to reach the HTML document shown in FIG. 22E, i.e. the top page, by following the higher order pages one by one as described above.

There are a plurality of "Return to" in FIG. 22B, i.e. there exist links to each hierarchy. In such a case, it is necessary to determine which one is the page whose order is higher by one. Then, it is determined by comparing a number (depth) of directories containing the address of the URL at the destination of each link. Generally, the less the number of directories, the higher the order of the page is.

FIG. 23 is what titles, i.e. the character strings in <TITLE> . . . </TITLE>, of each page extracted from hierarchical pages thus obtained are represented hierarchically. A context of the retrieved pages (relationship with the surrounding pages) can be understood and an outline of the page can be understood by presenting such information within the abstract of the retrieved page. It is also useful to embed a link such that the displayed document is changed to an intermediate page having a character string as a title thereof when each of these hierarchical display is clicked.

FIG. 24 is what is displayed by extracting character strings in which a link jumping to a sub-page is pasted (clickable part) for each page and one which is closest to the link among character strings which are marked up by tags <H1> . . . </H1> and are judged to be an equivalence of a header, instead of extracting the title from each page. This representation has the same effect with that shown in FIG. 23.

[Third Embodiment]

Next, a case when the abstract creating system 11 shown in FIG. 1 is incorporated in the retrieve server called an Intranet document retrieve server will be explained as a third embodiment of the present invention.

Figure 25:
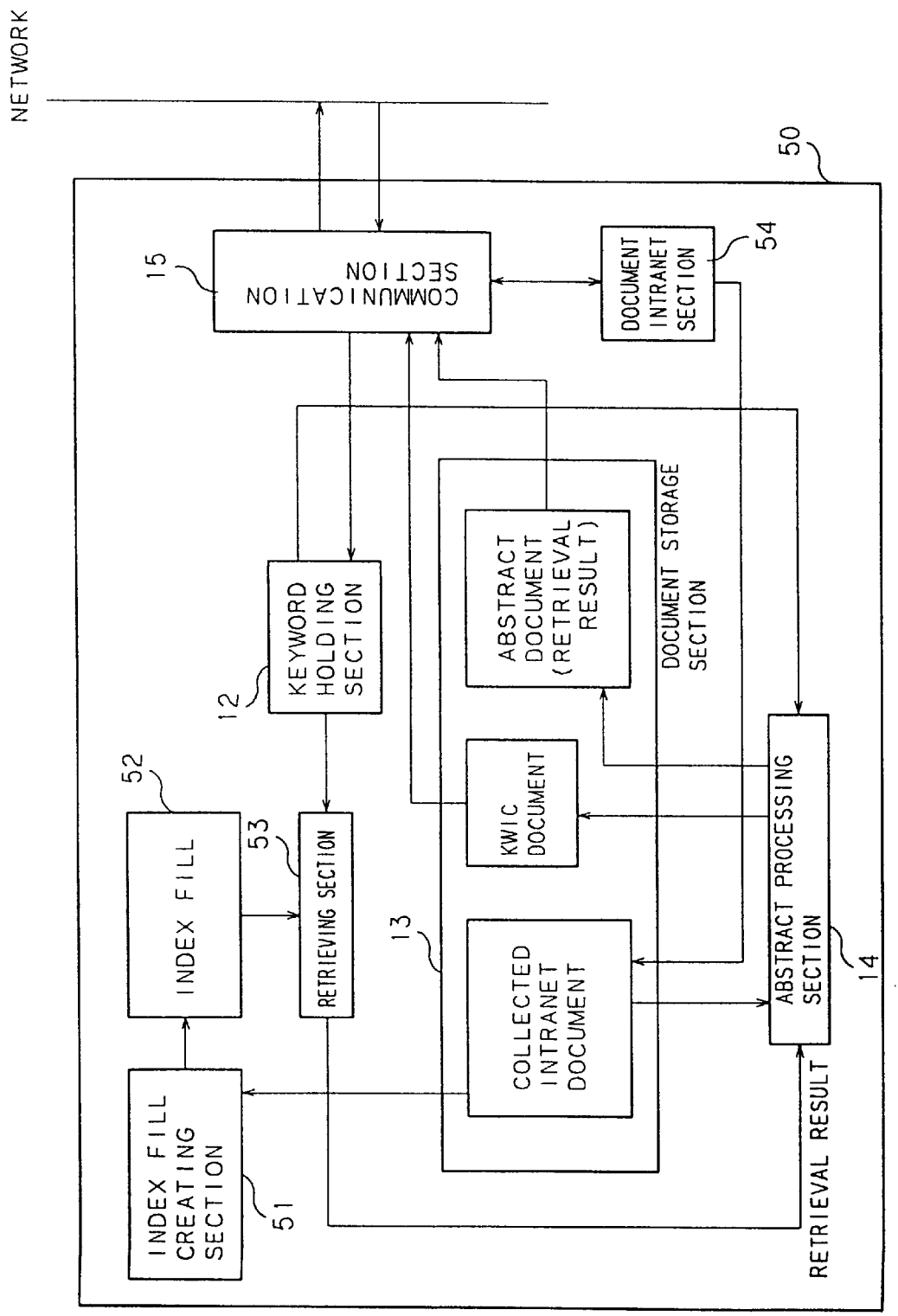
FIG. 25 is a diagram showing a structure of an Intranet document retrieve server of the computerized document processing system according to a third embodiment of the present invention.
Figure 26:
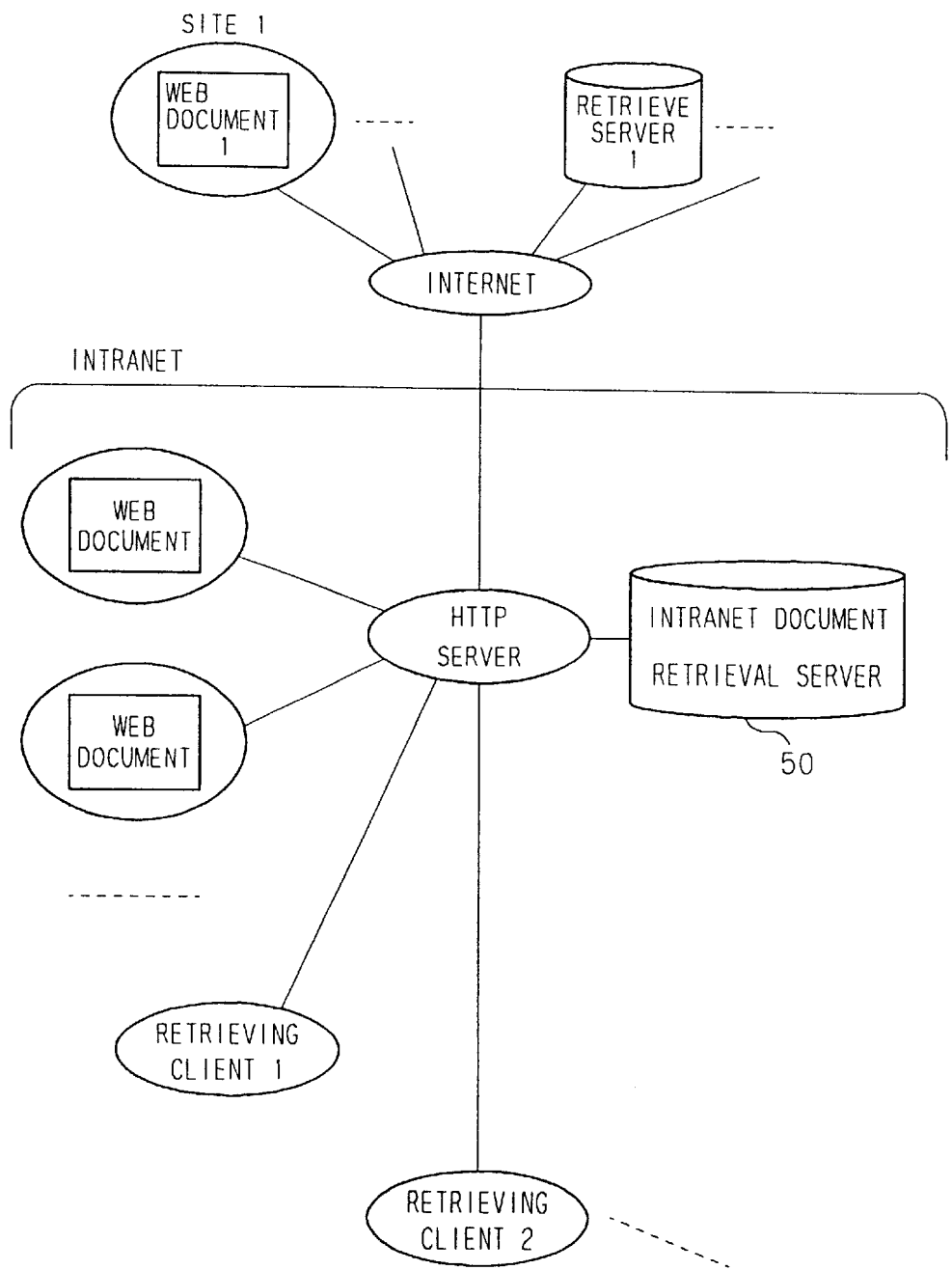
FIG. 26 is a diagram showing an example of a network environment of the computerized document processing system shown in FIG. 25.

FIG. 25 shows an exemplary structure of the main part of the Intranet document retrieve server 50. This Intranet document retrieve server is provided on a HTTP server within LAN called Intranet as shown in FIG. 26.

In FIG. 25, the same components with those in FIG. 1 are denoted by the same reference numerals and only the part different from those in FIG. 1 will be explained here. That is, the Intranet document retrieve server comprises a communication section 15, an index file creating section 51, an index file storage section 52, a retrieving section 53 and a document collecting section 54, in addition to the document storage section 13, the keyword holding section 12 and the abstract processing section 14 in FIG. 1. The other components are the same with those of the normal retrieve server.

The document storage section 13 holds documents within Intranet such as documents within a company and copies of documents having no problem in terms of copy right among Internet documents.

The document collecting section 54 collects internal and external Internet documents periodically and updates stored documents. The processing for this collection is normally called as a robot.

The Intranet document retrieve server 50 retrieves the Intranet documents collected in the document storage section 13 at high speed. The index file creating section 51 creates an index file so that keywords can be retrieved readily and the index file storage section 52 stores the index file.

The document storage section 13 also holds an abstract document and a KWIC document of a retrieved document. The communication section 15 communicates with the HTTP server or the PROXY server. The keyword holding section 12 holds keywords and the like contained in the retrieve request sent from a user. The retrieving section 53 retrieves the index file based on the retrieving conditions such as a keyword stored in the keyword holding section 12.

A processing operation of the Intranet document retrieve server 50 shown in FIG. 25 will be explained below.

The HTTP server receives a retrieve request from a client and activates the retrieve server 50 on the HTTP to retrieve a document when the document to be retrieved is an internal document. The document of the retrieved result is taken out immediately from the document storage section 13 and the abstract processing section 14 creates its abstract. Then, a ranking and the created abstract are sent to the client.

When the document to be retrieved is not an internal document, the retrieve request from the client is re-transferred from the HTTP server to each external retrieve server. The processes thereafter are almost the same with those explained in the first embodiment. What is different is that the retrieved result merging process and the abstract creating process are implemented on the HTTP, not on the PC of the client.

Because the copies of all the internal Web pages may be thus held in Intranet, the abstracting process may be provided on the side of the retrieve server. Further, because it allows the process of downloading each document contained in the retrieved result from the location where that document exists to be omitted in this case, the abstract creating process may be implemented immediately after the retrieval. Accordingly, the abstract may be presented to the user more quickly.

As described above, the process in creating an abstract by extracting a keyword from a retrieved computerized document may be distributed and the original document may be readily modified to stretch a link from a predetermined portion in the abstract to the original document by implementing the process for creating the abstract of the computerized document on the client terminal or on the retrieve server within Intranet.

Figure 2:
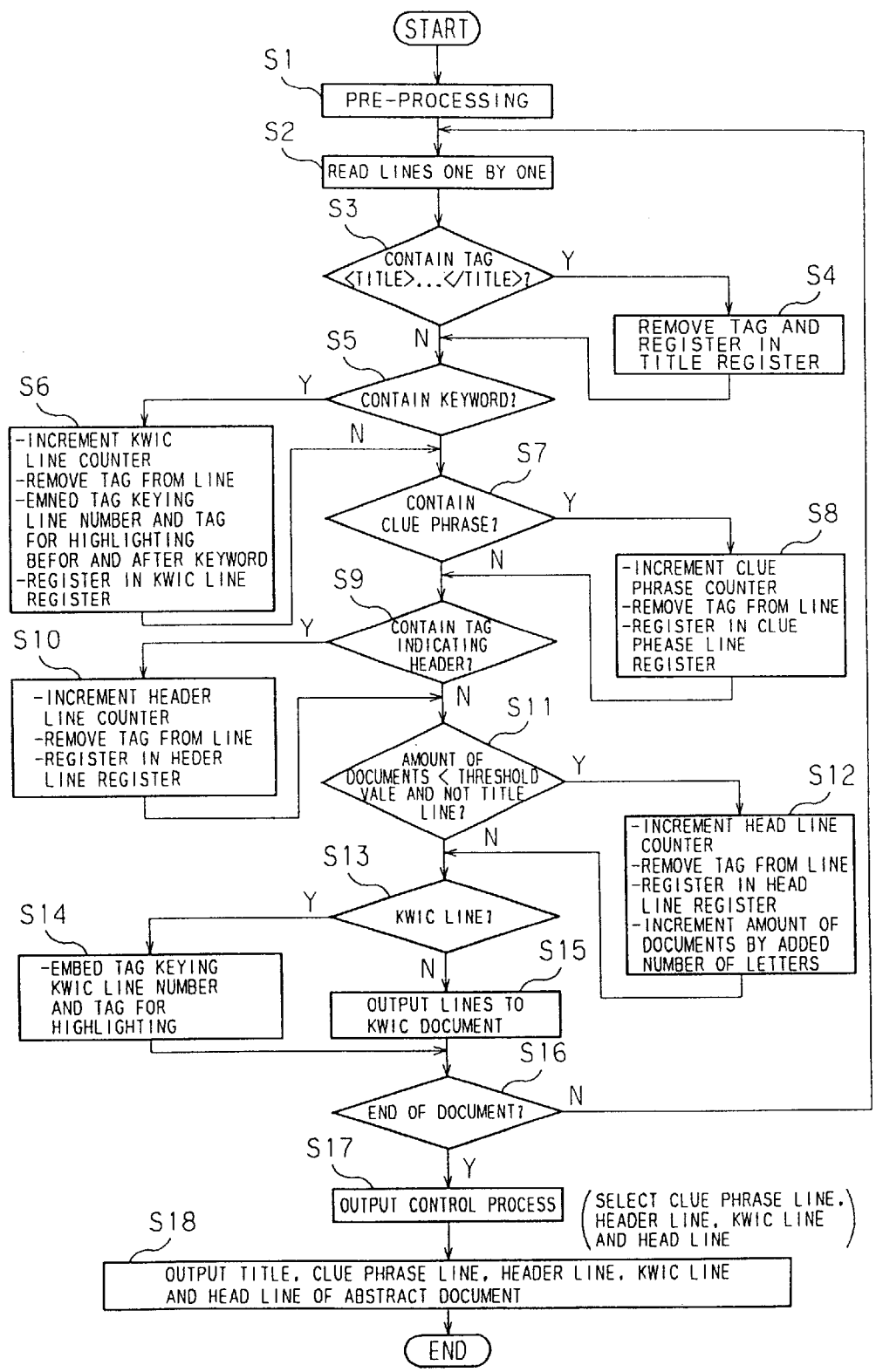
FIG. 2 is a flow chart showing a procedure for creating an abstract.

It is noted that it is possible to realize the steps in FIG. 2 of the present invention by a program readable by a computer. It is also possible to distribute this program by a storage medium such as a floppy disk and CD-ROM.

While preferred embodiments of the present invention have been described, variations thereto will occur to those skilled in the art within the scope of the present inventive concepts which are delineated by the following claim.

What is claimed is:

1. A computerized document apparatus for creating an abstract, comprising:

a display device for prompting a user to input at least one keyword and at least one logical condition;

retrieving means for retrieving, via a network, a plurality of computerized documents which contain said keyword and satisfy the logical condition;

a keyword storage device configured to store the at least one keyword;

a document storage device configured for storing the plurality of documents; and an abstract creation mechanism for:

creating a plurality of abstracts, each corresponding to one of the plurality of documents, by extracting at least a character string containing the at least one keyword stored in the keyword storage device from each of the computerized documents stored in the document storage device and inserting tags for linking to a position of the keyword in the computerized documents in the extracted character string;

generating modified copies of the stored computerized documents by inserting, in said modified copies, tags for linking positions of the keyword in the abstracts with positions within the modified copies in which the keyword occurs, wherein the modified copies of the stored computerized documents are stored in the document storage device;

combining the plurality of abstracts into a single abstract document; and displaying the single abstract document and the positions in the modified copies of the computerized documents that are linked with keywords in the single abstract document, whereby the positions in the modified copies are retrieved from the document storage device and displayed when the linked keywords in the abstract are chosen.

\* \* \* \* \*